United States Patent
Yu

(10) Patent No.: US 12,149,390 B2
(45) Date of Patent: Nov. 19, 2024

(54) DATA SENDING AND RECEIVING METHOD AND APPARATUS UTILIZING SIGNATURES SYMBOL TO IDENTIFY PPDU

(71) Applicant: Huawei Technologies Co., Ltd., Shenzhen (CN)

(72) Inventor: Jian Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 338 days.

(21) Appl. No.: 17/574,455

(22) Filed: Jan. 12, 2022

(65) Prior Publication Data

US 2022/0141062 A1 May 5, 2022

Related U.S. Application Data

(63) Continuation of application No. PCT/CN2020/097818, filed on Jun. 23, 2020.

(30) Foreign Application Priority Data

Jul. 12, 2019 (CN) .......................... 201910631626.5

(51) Int. Cl.
*H04L 27/26* (2006.01)
*H04L 1/00* (2006.01)
(Continued)

(52) U.S. Cl.
CPC ........ *H04L 27/2602* (2013.01); *H04L 1/0061* (2013.01); *H04L 5/0044* (2013.01); *H04W 80/02* (2013.01)

(58) Field of Classification Search
CPC . H04L 27/2602; H04L 1/0061; H04L 5/0044; H04W 80/02
See application file for complete search history.

(56) References Cited

U.S. PATENT DOCUMENTS

2011/0249660 A1* 10/2011 Noh .................. H04L 27/2602
370/338
2012/0201316 A1* 8/2012 Zhang ................. H03M 13/23
375/260
(Continued)

FOREIGN PATENT DOCUMENTS

CN 109996343 A 7/2019
CN 110708148 A 1/2020
(Continued)

OTHER PUBLICATIONS

Huawei, HiSilicon, "NR numerology and frame structure for unlicensed bands," 3GPP TSG RAN WG1 Meeting #95, Spokane, USA, R1-1812191, total 13 pages, 3rd Generation Partnership Project, Valbonne, France (Nov. 12-Nov. 16, 2018).
(Continued)

*Primary Examiner* — Jael M Ulysse
(74) *Attorney, Agent, or Firm* — Leydig, Voit & Mayer, Ltd.

(57) ABSTRACT

A transmitter sends a PPDU including a signature symbol to a receiver, where a first preset bit in the signature symbol indicates a standard version corresponding to the PPDU and/or a value of each bit in a second preset bit is 0 or 1. After the receiver receives the PPDU, if the standard version corresponding to the PPDU indicated by the first preset bit in the signature symbol in the PPDU is a standard version corresponding to a first PPDU and/or the value of each bit in the second preset bit in the signature symbol is the same as the preset value, the receiver determines that the received PPDU is the first PPDU. the transmitter and the receiver determine, by using the signature symbol in the PPDU, whether the received PPDU is the first PPDU, to identify the first PPDU, so that information in the received PPDU is correctly interpreted.

19 Claims, 18 Drawing Sheets

(51) Int. Cl.
H04L 5/00 (2006.01)
H04W 80/02 (2009.01)

(56) References Cited

U.S. PATENT DOCUMENTS

| | | | | |
|---|---|---|---|---|
| 2013/0128807 A1* | 5/2013 | Vermani | H04L 5/0053 | 370/328 |
| 2013/0170411 A1* | 7/2013 | Vermani | H04L 1/16 | 370/310 |
| 2013/0259017 A1* | 10/2013 | Zhang | H04L 1/0072 | 370/338 |
| 2013/0315219 A1* | 11/2013 | Cheong | H04W 28/16 | 370/338 |
| 2014/0029681 A1* | 1/2014 | Zhang | H04L 1/0046 | 375/260 |
| 2014/0071996 A1* | 3/2014 | Tetzlaff | H04L 1/0031 | 370/474 |
| 2014/0314064 A1* | 10/2014 | Park | H04L 27/2626 | 370/338 |
| 2014/0369263 A1* | 12/2014 | Vermani | H04W 40/02 | 370/328 |
| 2015/0023288 A1* | 1/2015 | Vermani | H04L 5/005 | 370/329 |
| 2015/0146653 A1* | 5/2015 | Zhang | H04W 72/0453 | 370/329 |
| 2016/0050093 A1* | 2/2016 | Choi | H04L 5/0053 | 375/308 |
| 2016/0087825 A1* | 3/2016 | Tian | H04L 27/2602 | 370/338 |
| 2016/0156438 A1* | 6/2016 | Sun | H04L 27/2602 | 370/330 |
| 2016/0204912 A1* | 7/2016 | Sun | H04L 27/12 | 375/302 |
| 2016/0241682 A1* | 8/2016 | Xu | H04L 1/0068 | |
| 2016/0330047 A1* | 11/2016 | Seok | H04L 27/2651 | |
| 2016/0330300 A1 | 11/2016 | Josiam | H04L 65/40 | |
| 2016/0330715 A1* | 11/2016 | Chen | H04W 72/04 | |
| 2017/0048034 A1* | 2/2017 | Bharadwaj | H04L 1/0072 | |
| 2017/0134043 A1* | 5/2017 | Lee | H03M 13/6362 | |
| 2017/0195107 A1* | 7/2017 | Liu | H04L 27/2602 | |
| 2017/0207944 A1* | 7/2017 | Zhang | H04L 9/40 | |
| 2017/0214561 A1* | 7/2017 | Lee | H04L 5/0007 | |
| 2017/0230218 A1* | 8/2017 | Park | H04L 5/0048 | |
| 2017/0279864 A1* | 9/2017 | Chun | H04L 5/0073 | |
| 2017/0280462 A1* | 9/2017 | Chun | H04W 84/04 | |
| 2017/0339692 A1* | 11/2017 | Chun | H04L 27/2602 | |
| 2017/0373901 A1* | 12/2017 | Lim | H04W 48/12 | |
| 2018/0014329 A1* | 1/2018 | Lee | H04L 27/2603 | |
| 2018/0091347 A1* | 3/2018 | Lee | H04L 27/26136 | |
| 2019/0007973 A1* | 1/2019 | Lou | H04W 74/006 | |
| 2019/0036754 A1* | 1/2019 | Lee | H04L 27/2607 | |
| 2019/0097850 A1* | 3/2019 | Kenney | H04L 27/0012 | |
| 2019/0173693 A1* | 6/2019 | Aboul-Magd | H04L 25/0226 | |
| 2019/0200298 A1* | 6/2019 | Park | H04L 27/2607 | |
| 2019/0207623 A1* | 7/2019 | Lee | H04L 1/0061 | |
| 2019/0268098 A1* | 8/2019 | Chun | H04W 80/02 | |
| 2020/0037331 A1* | 1/2020 | Chun | H04L 27/2601 | |
| 2020/0127681 A1* | 4/2020 | Verma | H04L 5/0044 | |
| 2020/0287759 A1* | 9/2020 | Van Nee | H04L 27/2613 | |
| 2020/0305164 A1* | 9/2020 | Yang | H04L 5/0007 | |
| 2020/0382998 A1* | 12/2020 | Cao | H04L 1/0041 | |
| 2021/0068095 A1* | 3/2021 | Gordaychik | H04W 72/044 | |
| 2021/0250125 A1* | 8/2021 | Park | H04L 27/2603 | |
| 2022/0182273 A1* | 6/2022 | Huang | H04L 5/0053 | |
| 2022/0345550 A1* | 10/2022 | Josiam | H04L 65/40 | |

FOREIGN PATENT DOCUMENTS

| | | | |
|---|---|---|---|
| CN | 107079012 B | 2/2020 | |
| KR | 20170066578 A | 6/2017 | |
| WO | WO-2013036642 A1 * | 3/2013 | H04L 1/0079 |
| WO | 2021002680 A1 | 1/2021 | |

OTHER PUBLICATIONS

Ron Porat, Broadcom, "Autodetection with Signature Symbol," doc.: IEEE 802.11-15/0643, total 9 pages (May 2015).

Alphan Sahin (Interdigital), "A comparison of BPSK-Mark Options," doc.: IEEE 802.11-18/1156r1, total 16 pages (Jul. 2018).

"IEEE Standard for Information technology-Telecommunications and information exchange between systems Local and metropolitan area networks-Specific requirements, Part 11: Wireless LAN Medium Access Control (MAC) and Physical Layer (PHY) Specifications," IEEE Std 802.11™—2016, total 3534 pages (Approved Dec. 7, 2016).

"IEEE P802.11ax™/D2.2, Draft Standard for Information technology-Telecommunications and information exchange between systems Local and metropolitan area networks-Specific requirements, Part 11: Wireless LAN Medium Access Control(MAC) and Physical Layer (PHY) Specifications, Amendment 6: Enhancements for High Efficiency WLAN," IEEE P802.11ax™/D2.2, total 620 pages (Feb. 2018).

* cited by examiner

| L-STF | L-LTF | L-SIG | RL-SIG | HE-SIG-A | HE-STF | HE-LTF | Data | PE |
|---|---|---|---|---|---|---|---|---|
| | BPSK | BPSK | BPSK BPSK | | | | | |

Quantity of symbols: 2, 2, 1, 1, 2, 1, 1–8, 1–N (a) HE SU PPDU

| L-STF | L-LTF | L-SIG | RL-SIG | HE-SIG-A | HE-SIG-B | HE-STF | HE-LTF | Data | PE |
|---|---|---|---|---|---|---|---|---|---|
| | | BPSK | BPSK BPSK | | | | | | |

Quantity of symbols: 2, 2, 1, 1, 2, 1–M, 1, 1–8, 1–N (b) HE MU PPDU

| L-STF | L-LTF | L-SIG | RL-SIG | HE-SIG-A | HE-STF | HE-LTF | Data | PE |
|---|---|---|---|---|---|---|---|---|
| | | BPSK | BPSK BPSK | | | | | |

Quantity of symbols: 2, 2, 1, 1, 2, 1, 1–8, 1–N (c) HE TB PPDU

| L-STF | L-LTF | L-SIG | RL-SIG | HE-SIG-A | HE-STF | HE-LTF | Data | PE |
|---|---|---|---|---|---|---|---|---|
| | | BPSK | BPSK BPSK | QBPSK BPSK | | | | |

Quantity of symbols: 2, 2, 1, 1, 4, 1, 1–8, 1–N (d) HE ER SU PPDU

FIG. 5

| L-STF | L-LTF | L-SIG | (Masked) RL-SIG | Signature symbol | ... |
|---|---|---|---|---|---|
| | | BPSK | BPSK | | |

FIG. 11

DATA SENDING AND RECEIVING METHOD AND APPARATUS UTILIZING SIGNATURES SYMBOL TO IDENTIFY PPDU

CROSS-REFERENCE TO RELATED APPLICATIONS

This application is a continuation of International Application No. PCT/CN2020/097818, filed on Jun. 23, 2020, which claims priority to Chinese Patent Application No. 201910631626.5, filed on Jul. 12, 2019. The disclosures of the aforementioned applications are hereby incorporated by reference in their entireties.

TECHNICAL FIELD

This application relates to the field of communication technologies, and in particular, to a data sending and receiving method and apparatus.

BACKGROUND

Currently, several versions of wireless local area network (WLAN) protocol standards have been formulated over time. Each version defines a frame format of a physical layer protocol data unit (PPDU). The PPDU includes a preamble part and a data part. A receiver that supports updated protocol standards can identify a PPDU frame format in a protocol standard of a received PPDU through automatic detection, to correctly interpret information in the received PPDU. A PPDU in a next-generation standard of the latest WLAN protocol standard 802.11ax may be referred to as an extremely high throughput (EHT) PPDU. In design of a preamble part in the EHT PPDU, there is no solution yet for how to enable a receiver to distinguish an EHT PPDU from several PPDUs defined in other protocol standards.

SUMMARY

This application provides a data sending and receiving method and apparatus, to enable a receiver to distinguish an EHT PPDU from several PPDUs defined in other protocol standards, so that the receiver correctly interprets information in a received PPDU.

To achieve the foregoing objective, this application provides the following technical solutions.

According to a first aspect, a data sending method is provided. The method includes: A transmitter generates a PPDU, where the first OFDM symbol following an L-SIG in the PPDU is a signature symbol, a modulation scheme of the signature symbol is BPSK modulation, and the signature symbol includes one or more of the following features: (1) a first preset bit indicates a standard version corresponding to the PPDU; and (2) a value of each bit in a second preset bit is 0 or 1; and the transmitter sends the PPDU to a receiver. According to the method provided in the first aspect, the transmitter and the receiver may determine, by using the signature symbol in the PPDU, whether the received PPDU is a first PPDU, to identify the first PPDU, so that information in the received PPDU is correctly interpreted.

In a possible implementation, the second preset bit includes one or more of b2, b3, b4, and b10, where b2=0, b3=0, b4=1, and b10=1. In this possible implementation, the receiver may further distinguish between the first PPDU, an HE PPDU, and a VHT PPDU.

In a possible implementation, the signature symbol further includes one or more of the following features: (3) a CRC in a third preset bit is configured to check a part of or all bits in the signature symbol; and (4) a tail bit is used to end BCC encoding, where the signature symbol uses the BCC encoding.

In a possible implementation, a quantity of bits and/or locations of the bits occupied by the CRC in the signature symbol are different from a quantity of bits and/or locations of the bits occupied by a parity bit in an RL-SIG in the HE PPDU.

In a possible implementation, a modulation scheme of an OFDM symbol following the signature symbol is BPSK modulation; or a modulation scheme of the OFDM symbol following the signature symbol is QBPSK modulation.

According to a second aspect, a data receiving method is provided. The method includes: A receiver receives a PPDU; and when the receiver detects that a modulation scheme of a signature symbol in the PPDU is BPSK modulation, and the signature symbol meets a preset condition, the receiver determines that the PPDU is a first PPDU. The signature symbol is the first OFDM symbol following an L-SIG in the PPDU. The preset condition includes one or more of the following conditions: (1) a standard version corresponding to the PPDU indicated by a first preset bit in the signature symbol is a standard version corresponding to the first PPDU; and (2) a value of each bit in a second preset bit in the signature symbol is the same as a preset value. According to the method provided in the second aspect, the transmitter and the receiver may determine, by using the signature symbol in the PPDU, whether the received PPDU is the first PPDU, to identify the first PPDU, so that information in the received PPDU is correctly interpreted.

In a possible implementation, the second preset bit includes one or more of b2, b3, b4, and b10, where a preset value of b2 is 0, a preset value of b3 is 0, a preset value of b4 is 1, and a preset value of b10 is 1. In this possible implementation, the receiver may further distinguish between the first PPDU, an HE PPDU, and a VHT PPDU.

In a possible implementation, before the receiver determines that the PPDU is the first PPDU, the method further includes: The receiver decodes the signature symbol based on a tail bit in the signature symbol, where a check on a part of or all bits in the signature symbol by using a cyclic redundancy code CRC in a third preset bit in the signature symbol passes.

In a possible implementation, a quantity of bits and/or locations of the bits occupied by the CRC in the signature symbol are different from a quantity of bits and/or locations of the bits occupied by a parity bit in an RL-SIG in the HE PPDU.

In a possible implementation, a modulation scheme of an OFDM symbol following the signature symbol is BPSK modulation, and the preset condition further includes: determining that the modulation scheme of the OFDM symbol following the signature symbol is BPSK modulation. Alternatively, a modulation scheme of an OFDM symbol following the signature symbol is QBPSK modulation, and the preset condition further includes: determining that the modulation scheme of the OFDM symbol following the signature symbol is QBPSK modulation.

According to a third aspect, a data sending method is provided. The method includes: A transmitter generates a PPDU, where the PPDU includes a signature symbol, and the signature symbol includes a first bit sequence and a second bit sequence generated through channel coding on information bits; and the transmitter sends the PPDU to a receiver. According to the method provided in the third aspect, because channel coding is not performed on the first bit sequence sent by the transmitter, the receiver may directly extract the first bit sequence without performing channel decoding, to quickly determine whether the received PPDU is a first PPDU. This improves processing efficiency of the receiver. In addition, the receiver may further check a part of or all bits in the information bits. If the check passes, the receiver may further determine that the received PPDU is the first PPDU. This improves determining accuracy.

In a possible implementation, the first bit sequence is a bit sequence on which channel coding is not performed.

In a possible implementation, the first bit sequence is a Gray sequence.

In a possible implementation, before the transmitter sends the PPDU to the receiver, the method further includes: The receiver performs interleaving processing on the first bit sequence and the second bit sequence obtained after channel coding.

In a possible implementation, the first bit sequence is located in the first OFDM symbol or the second OFDM symbol following an L-SIG in the PPDU, and the first bit sequence includes one or more of the following features: (1) a first preset bit indicates a standard version corresponding to the PPDU; and (2) a value of each bit in the second preset bit is 0 or 1.

In a possible implementation, the first bit sequence is located in the first OFDM symbol following the L-SIG in the PPDU, and the second preset bit includes one or more of b2, b3, b4, and b10, where b2=0, b3=0, b4=1, and b10=1.

In a possible implementation, the first bit sequence is located in the second OFDM symbol following the L-SIG in the PPDU, and the second preset bit includes one or more of the following: (1) b0 and b1, (2) b2 and b3, (3) b9, and (4) b14, where b0=0, b1=1, b2=0, b3=1, b9=0, and b14=0.

According to a fourth aspect, a data receiving method is provided. The method includes: A receiver receives a PPDU, where the PPDU includes a signature symbol; the receiver extracts a first bit sequence from the signature symbol; the receiver performs channel decoding on a second bit sequence in the signature symbol to obtain information bits; and if the first bit sequence matches with a prestored first bit sequence and/or a check on a part of or all bits in the information bits passes, the receiver determines that the PPDU to which the signature symbol belongs is a first PPDU. According to the method provided in the fourth aspect, because channel coding is not performed on the first bit sequence sent by the transmitter, the receiver may directly extract the first bit sequence without performing channel decoding, to quickly determine whether the received PPDU is the first PPDU. This improves processing efficiency of the receiver. In addition, the receiver may further check a part of or all bits in the information bits. If the check passes, the receiver may further determine that the received PPDU is the first PPDU. This improves determining accuracy.

In a possible implementation, the first bit sequence is a bit sequence on which channel coding is not performed.

In a possible implementation, the first bit sequence is a Gray sequence.

In a possible implementation, the first bit sequence is located in the first OFDM symbol or the second OFDM symbol following an L-SIG in the PPDU. Before the receiver determines that the PPDU to which the signature symbol belongs is the first PPDU, the method further includes: The receiver determines that the first bit sequence meets a preset condition, where the preset condition includes one or more of the following conditions: (1) a standard version corresponding to the PPDU indicated by a first preset bit in the first bit sequence is a standard version corresponding to the first PPDU; and (2) a value of each bit in a second preset bit in the first bit sequence is the same as a preset value.

In a possible implementation, the first bit sequence is located in the first OFDM symbol following the L-SIG in the PPDU, and the second preset bit includes one or more of b2, b3, b4, and b10, where a preset value of b2 is 0, a preset value of b3 is 0, a preset value of b4 is 1, and a preset value of b10 is 1.

In a possible implementation, the first bit sequence is located in the second OFDM symbol following the L-SIG in the PPDU, and the second preset bit includes one or more of the following: (1) b0 and b1, (2) b2 and b3, (3) b9, and (4) b14, where a preset value of b0 is 0, a preset value of b1 is 1, a preset value of b2 is 0, a preset value of b3 is 1, a preset value of b9 is 0, and a preset value of b14 is 0.

According to a fifth aspect, a data sending method is provided. The method includes: A transmitter generates a PPDU, where the second OFDM symbol following an L-SIG in the PPDU is a signature symbol, and the signature symbol includes one or more of the following features: (1) a first preset bit indicates a standard version corresponding to the PPDU; and (2) a value of each bit in a second preset bit is 0 or 1; and the transmitter sends the PPDU to a receiver. According to the method provided in the fifth aspect, the transmitter and the receiver may determine, by using the signature symbol in the PPDU, whether the received PPDU is the first PPDU, to identify the first PPDU, so that information in the received PPDU is correctly interpreted.

In a possible implementation, the first OFDM symbol following the L-SIG in the PPDU is an L-SIG obtained after masking is performed on the L-SIG.

In a possible implementation, the second preset bit includes one or more of the following: (1) b0 and b1, (2) b2 and b3, (3) b9, and (4) b14, where b0=0, b1=1, b2=0, b3=1, b9=0, and b14=0. In this possible implementation, the receiver may further distinguish between the first PPDU, an HE PPDU, and a VHT PPDU.

In a possible implementation, the signature symbol further includes one or more of the following features: (3) a CRC in a third preset bit is configured to check a part of or all bits in the signature symbol; and (4) a tail bit is used to end BCC encoding, where the signature symbol uses the BCC encoding.

In a possible implementation, a quantity of bits and/or locations of the bits occupied by the CRC in the signature symbol are different from a quantity of bits and/or locations of the bits occupied by a CRC in the second OFDM symbol in a VHT-SIG-A in a VHT PPDU.

In a possible implementation, a modulation scheme of the signature symbol is BPSK modulation; or a modulation scheme of the signature symbol is QBPSK modulation.

In a possible implementation, a remainder obtained after a value of a length field in the L-SIG in the PPDU modulo 3 is 1 or 2. Alternatively, a remainder obtained after a value of a length field in the L-SIG in the PPDU modulo 3 is 0.

According to a sixth aspect, a data receiving method is provided. The method includes: A receiver receives a PPDU; and when the receiver detects that a signature symbol in the PPDU meets a preset condition, the receiver determines that the PPDU is a first PPDU. The signature symbol is the second OFDM symbol following an L-SIG in the PPDU.

The preset condition includes one or more of the following conditions: (1) a standard version corresponding to the PPDU indicated by a first preset bit in the signature symbol is a standard version corresponding to the first PPDU; and (2) a value of each bit in a second preset bit in the signature symbol is the same as a preset value. According to the method provided in the sixth aspect, the transmitter and the receiver may determine, by using the signature symbol in the PPDU, whether the received PPDU is the first PPDU, to identify the first PPDU, so that information in the received PPDU is correctly interpreted.

In a possible implementation, the first OFDM symbol following the L-SIG in the PPDU is an L-SIG obtained after masking is performed on the L-SIG, and the preset condition further includes: information obtained after the first OFDM symbol following the L-SIG in the PPDU is demasked is the same as that of the L-SIG.

In a possible implementation, the second preset bit includes one or more of the following: (1) b0 and b1, (2) b2 and b3, (3) b9, and (4) b14, where a preset value of b0 is 0, a preset value of b1 is 1, a preset value of b2 is 0, a preset value of b3 is 1, a preset value of b9 is 0, and a preset value of b14 is 0. In this possible implementation, the receiver may further distinguish between the first PPDU, an HE PPDU, and a VHT PPDU.

In a possible implementation, before the receiver determines that the PPDU is the first PPDU, the method further includes: The receiver decodes the signature symbol based on a tail bit in the signature symbol, where a check on a part of or all bits in the signature symbol by using a cyclic redundancy code CRC in a third preset bit in the signature symbol passes.

In a possible implementation, a quantity of bits and/or locations of the bits occupied by the CRC in the signature symbol are different from a quantity of bits and/or locations of the bits occupied by a CRC in the second OFDM symbol in a VHT-SIG-A in a VHT PPDU.

In a possible implementation, a modulation scheme of the signature symbol is BPSK modulation, and the preset condition further includes: determining that the modulation scheme of the signature symbol is BPSK modulation. Alternatively, a modulation scheme of the signature symbol is QBPSK modulation, and the preset condition further includes: determining that the modulation scheme of the signature symbol is QBPSK modulation.

In a possible implementation, a remainder obtained after a value of a length field in the L-SIG in the PPDU modulo 3 is 1 or 2, and the preset condition further includes: determining that the remainder obtained after the value of the length field in the L-SIG in the PPDU modulo 3 is 1 or 2. Alternatively, a remainder obtained after a value of a length field in the L-SIG in the PPDU modulo 3 is 0, and the preset condition further includes: determining that the remainder obtained after the value of the length field in the L-SIG in the PPDU modulo 3 is 0.

According to a seventh aspect, a transmitter apparatus is provided. The apparatus includes a processing unit and a sending unit. The processing unit is configured to generate a PPDU, where the first OFDM symbol following an L-SIG in the PPDU is a signature symbol, a modulation scheme of the signature symbol is BPSK modulation, and the signature symbol includes one or more of the following features: (1) a first preset bit indicates a standard version corresponding to the PPDU; and (2) a value of each bit in a second preset bit is 0 or 1. The sending unit is configured to send the PPDU to a receiver.

In a possible implementation, the second preset bit includes one or more of b2, b3, b4, and b10, where b2=0, b3=0, b4=1, and b10=1.

In a possible implementation, the signature symbol further includes one or more of the following features: (3) a CRC in a third preset bit is configured to check a part of or all bits in the signature symbol; and (4) a tail bit is used to end BCC encoding, where the signature symbol uses the BCC encoding.

In a possible implementation, a quantity of bits and/or locations of the bits occupied by the CRC in the signature symbol are different from a quantity of bits and/or locations of the bits occupied by a parity bit in an RL-SIG in the HE PPDU.

In a possible implementation, a modulation scheme of an OFDM symbol following the signature symbol is BPSK modulation; or a modulation scheme of the OFDM symbol following the signature symbol is QBPSK modulation.

According to an eighth aspect, a receiver apparatus is provided. The apparatus includes a processing unit and a receiving unit. The receiving unit is configured to receive a PPDU. The processing unit is configured to: when the receiver apparatus detects that a modulation scheme of a signature symbol in the PPDU is BPSK modulation, and the signature symbol meets a preset condition, determine that the PPDU is a first PPDU. The signature symbol is the first OFDM symbol following an L-SIG in the PPDU. The preset condition includes one or more of the following conditions: (1) a standard version corresponding to the PPDU indicated by a first preset bit in the signature symbol is a standard version corresponding to the first PPDU; and (2) a value of each bit in a second preset bit in the signature symbol is the same as a preset value.

In a possible implementation, the second preset bit includes one or more of b2, b3, b4, and b10, where a preset value of b2 is 0, a preset value of b3 is 0, a preset value of b4 is 1, and a preset value of b10 is 1.

In a possible implementation, the processing unit is further configured to: decode the signature symbol based on a tail bit in the signature symbol, where a check on a part of or all bits in the signature symbol by using a CRC in a third preset bit in the signature symbol passes.

In a possible implementation, a quantity of bits and/or locations of the bits occupied by the CRC in the signature symbol are different from a quantity of bits and/or locations of the bits occupied by a parity bit in an RL-SIG in the HE PPDU.

In a possible implementation, a modulation scheme of an OFDM symbol following the signature symbol is BPSK modulation, and the preset condition further includes: determining that the modulation scheme of the OFDM symbol following the signature symbol is BPSK modulation. Alternatively, a modulation scheme of an OFDM symbol following the signature symbol is QBPSK modulation, and the preset condition further includes: determining that the modulation scheme of the OFDM symbol following the signature symbol is QBPSK modulation.

According to a ninth aspect, a transmitter apparatus is provided. The apparatus includes a processing unit and a sending unit. The processing unit is configured to generate a PPDU, where the PPDU includes a signature symbol, and the signature symbol includes a first bit sequence and a second bit sequence generated through channel coding on information bits. The sending unit is configured to send the PPDU to a receiver.

In a possible implementation, the first bit sequence is a bit sequence on which channel coding is not performed.

In a possible implementation, the first bit sequence is a Gray sequence.

In a possible implementation, the processing unit is further configured to perform interleaving processing on the first bit sequence and the second bit sequence obtained after channel coding.

In a possible implementation, the first bit sequence is located in the first OFDM symbol or the second OFDM symbol following an L-SIG in the PPDU, and the first bit sequence includes one or more of the following features: (1) a first preset bit indicates a standard version corresponding to the PPDU; and (2) a value of each bit in the second preset bit is 0 or 1.

In a possible implementation, the first bit sequence is located in the first OFDM symbol following the L-SIG in the PPDU, and the second preset bit includes one or more of b2, b3, b4, and b10, where b2=0, b3=0, b4=1, and b10=1.

In a possible implementation, the first bit sequence is located in the second OFDM symbol following the L-SIG in the PPDU, and the second preset bit includes one or more of the following: (1) b0 and b1, (2) b2 and b3, (3) b9, and (4) b14, where b0=0, b1=1, b2=0, b3=1, b9=0, and b14=0.

According to a tenth aspect, a receiver apparatus is provided. The apparatus includes a receiving unit and a processing unit. The receiving unit is configured to receive a PPDU, where the PPDU includes a signature symbol. The processing unit is configured to: extract a first bit sequence from the signature symbol; perform channel decoding on a second bit sequence in the signature symbol to obtain information bits; and if the first bit sequence matches with a prestored first bit sequence and/or a check on a part of or all bits in the information bits passes, determine that the PPDU to which the signature symbol belongs is a first PPDU.

In a possible implementation, the first bit sequence is a bit sequence on which channel coding is not performed.

In a possible implementation, the first bit sequence is a Gray sequence.

In a possible implementation, the first bit sequence is located in the first OFDM symbol or the second OFDM symbol following an L-SIG in the PPDU. The processing unit is further configured to determine that the first bit sequence meets a preset condition, where the preset condition includes one or more of the following conditions: (1) a standard version corresponding to the PPDU indicated by the first preset bit in the first bit sequence is a standard version corresponding to the first PPDU; and (2) a value of each bit in a second preset bit in the first bit sequence is the same as a preset value.

In a possible implementation, the first bit sequence is located in the first OFDM symbol following the L-SIG in the PPDU, and the second preset bit includes one or more of b2, b3, b4, and b10, where a preset value of b2 is 0, a preset value of b3 is 0, a preset value of b4 is 1, and a preset value of b10 is 1.

In a possible implementation, the first bit sequence is located in the second OFDM symbol following the L-SIG in the PPDU, and the second preset bit includes one or more of the following: (1) b0 and b1, (2) b2 and b3, (3) b9, and (4) b14, where a preset value of b0 is 0, a preset value of b1 is 1, a preset value of b2 is 0, a preset value of b3 is 1, a preset value of b9 is 0, and a preset value of b14 is 0.

According to an eleventh aspect, a transmitter apparatus is provided. The apparatus includes a processing unit and a sending unit. The processing unit is configured to generate a PPDU, where the second OFDM symbol following an L-SIG in the PPDU is a signature symbol, and the signature symbol includes one or more of the following features: (1) a first preset bit indicates a standard version corresponding to the PPDU; and (2) a value of each bit in a second preset bit is 0 or 1. The sending unit is configured to send the PPDU to a receiver.

In a possible implementation, the first OFDM symbol following the L-SIG in the PPDU is an L-SIG obtained after masking is performed on the L-SIG.

In a possible implementation, the second preset bit includes one or more of the following: (1) b0 and b1, (2) b2 and b3, (3) b9, and (4) b14, where b0=0, b1=1, b2=0, b3=1, b9=0, and b14=0.

In a possible implementation, the signature symbol further includes one or more of the following features: (3) a CRC in a third preset bit is configured to check a part of or all bits in the signature symbol; and (4) a tail bit is used to end BCC encoding, where the signature symbol uses the BCC encoding.

In a possible implementation, a quantity of bits and/or locations of the bits occupied by the CRC in the signature symbol are different from a quantity of bits and/or locations of the bits occupied by a CRC in the second OFDM symbol in a VHT-SIG-A in a VHT PPDU.

In a possible implementation, a modulation scheme of the signature symbol is BPSK modulation; or a modulation scheme of the signature symbol is QBPSK modulation.

In a possible implementation, a remainder obtained after a value of a length field in the L-SIG in the PPDU modulo 3 is 1 or 2. Alternatively, a remainder obtained after a value of a length field in the L-SIG in the PPDU modulo 3 is 0.

According to a twelfth aspect, a receiver apparatus is provided. The apparatus includes a receiving unit and a processing unit. The receiving unit is configured to receive a PPDU. The processing unit is configured to: when the receiver apparatus detects that a signature symbol in the PPDU meets a preset condition, determine that the PPDU is a first PPDU. The signature symbol is the second OFDM symbol following an L-SIG in the PPDU. The preset condition includes one or more of the following conditions: (1) a standard version corresponding to the PPDU indicated by a first preset bit in the signature symbol is a standard version corresponding to the first PPDU; and (2) a value of each bit in a second preset bit in the signature symbol is the same as a preset value.

In a possible implementation, the first OFDM symbol following the L-SIG in the PPDU is an L-SIG obtained after masking is performed on the L-SIG, and the preset condition further includes: information obtained after the first OFDM symbol following the L-SIG in the PPDU is demasked is the same as that of the L-SIG.

In a possible implementation, the second preset bit includes one or more of the following: (1) b0 and b1, (2) b2 and b3, (3) b9, and (4) b14, where a preset value of b0 is 0, a preset value of b1 is 1, a preset value of b2 is 0, a preset value of b3 is 1, a preset value of b9 is 0, and a preset value of b14 is 0.

In a possible implementation, the processing unit is further configured to: decode the signature symbol based on a tail bit in the signature symbol, where a check on a part of or all bits in the signature symbol by using a CRC in a third preset bit in the signature symbol passes.

In a possible implementation, a quantity of bits and/or locations of the bits occupied by the CRC in the signature symbol are different from a quantity of bits and/or locations of the bits occupied by a CRC in the second OFDM symbol in a VHT-SIG-A in a VHT PPDU.

In a possible implementation, a modulation scheme of the signature symbol is BPSK modulation, and the preset condition further includes: determining that the modulation scheme of the signature symbol is BPSK modulation. Alternatively, a modulation scheme of the signature symbol is QBPSK modulation, and the preset condition further includes: determining that the modulation scheme of the signature symbol is QBPSK modulation.

In a possible implementation, a remainder obtained after a value of a length field in the L-SIG in the PPDU modulo 3 is 1 or 2, and the preset condition further includes: determining that the remainder obtained after the value of the length field in the L-SIG in the PPDU modulo 3 is 1 or 2. Alternatively, a remainder obtained after a value of a length field in the L-SIG in the PPDU modulo 3 is 0, and the preset condition further includes: determining that the remainder obtained after the value of the length field in the L-SIG in the PPDU modulo 3 is 0.

According to a thirteenth aspect, a transmitter apparatus is provided. The apparatus includes a processor and a transmitter, where the processor is configured to generate the PPDU in any method provided in the first aspect, and the transmitter is configured to send the PPDU.

In a possible implementation, the transmitter apparatus further includes a memory, the processor is coupled to the memory, and the memory is configured to store computer instructions, so that the processor invokes the computer instructions to generate the PPDU in any method provided in the first aspect, and controls the transmitter to send the PPDU.

In a possible implementation, the memory and the processor are integrated together, or the memory and the processor are independent components.

According to a fourteenth aspect, a receiver apparatus is provided. The apparatus includes a processor and a receiver, where the receiver is configured to receive a PPDU, and the processor is configured to determine that the PPDU is a first PPDU.

In a possible implementation, the receiver apparatus further includes a memory, the processor is coupled to the memory, and the memory is configured to store computer instructions, so that the processor controls the receiver to receive a PPDU, and determines that the PPDU is a first PPDU.

In a possible implementation, the memory and the processor are integrated together, or the memory and the processor are independent components.

According to a fifteenth aspect, a transmitter apparatus is provided. The apparatus includes a processor and a transmitter, where the processor is configured to generate the PPDU in any method provided in the third aspect, and the transmitter is configured to send the PPDU.

In a possible implementation, the transmitter apparatus further includes a memory, the processor is coupled to the memory, and the memory is configured to store computer instructions, so that the processor invokes the computer instructions to generate the PPDU in any method provided in the third aspect, and controls the transmitter to send the PPDU.

In a possible implementation, the memory and the processor are integrated together, or the memory and the processor are independent components.

According to a sixteenth aspect, a receiver apparatus is provided. The apparatus includes a processor and a receiver, where the receiver is configured to receive a PPDU, and the processor is configured to determine that the PPDU to which a signature symbol belongs is a first PPDU.

In a possible implementation, the receiver apparatus further includes a memory, the processor is coupled to the memory, and the memory is configured to store computer instructions, so that the processor controls the receiver to receive a PPDU, and determines that the PPDU to which the signature symbol belongs is the first PPDU.

In a possible implementation, the memory and the processor are integrated together, or the memory and the processor are independent components.

According to a seventeenth aspect, a transmitter apparatus is provided. The apparatus includes a processor and a transmitter, where the processor is configured to generate the PPDU in any method provided in the fifth aspect, and the transmitter is configured to send the PPDU.

In a possible implementation, the transmitter apparatus further includes a memory, the processor is coupled to the memory, and the memory is configured to store computer instructions, so that the processor invokes the computer instructions to generate the PPDU in any method provided in the fifth aspect, and controls the transmitter to send the PPDU.

In a possible implementation, the memory and the processor are integrated together, or the memory and the processor are independent components.

According to an eighteenth aspect, a receiver apparatus is provided. The apparatus includes a processor and a receiver, where the receiver is configured to receive a PPDU, and the processor is configured to determine that the PPDU is a first PPDU.

In a possible implementation, the receiver apparatus further includes a memory, the processor is coupled to the memory, and the memory is configured to store computer instructions, so that the processor controls the receiver to receive a PPDU, and determines that the PPDU is a first PPDU.

In a possible implementation, the memory and the processor are integrated together, or the memory and the processor are independent components.

According to a nineteenth aspect, a transmitter apparatus is provided. The apparatus includes a logic circuit and an output interface, where the logic circuit and the output interface are configured to implement any method provided in the first aspect. The logic circuit is configured to perform a processing action in a corresponding method, and the output interface is configured to perform a sending action in a corresponding method.

According to a twentieth aspect, a receiver apparatus is provided. The apparatus includes a logic circuit and an input interface, where the logic circuit and the input interface are configured to implement any method provided in the second aspect. The logic circuit is configured to perform a processing action in a corresponding method, and the input interface is configured to perform a receiving action in a corresponding method.

According to a twenty-first aspect, a transmitter apparatus is provided. The apparatus includes a logic circuit and an output interface, where the logic circuit and the output interface are configured to implement any method provided in the third aspect. The logic circuit is configured to perform a processing action in a corresponding method, and the output interface is configured to perform a sending action in a corresponding method.

According to a twenty-second aspect, a receiver apparatus is provided. The apparatus includes a logic circuit and an input interface, where the logic circuit and the input interface are configured to implement any method provided in the fourth aspect. The logic circuit is configured to perform a processing action in a corresponding method, and the input interface is configured to perform a receiving action in a corresponding method.

According to a twenty-third aspect, a transmitter apparatus is provided. The apparatus includes a logic circuit and an output interface, where the logic circuit and the output interface are configured to implement any method provided in the fifth aspect. The logic circuit is configured to perform a processing action in a corresponding method, and the output interface is configured to perform a sending action in a corresponding method.

According to a twenty-fourth aspect, a receiver apparatus is provided. The apparatus includes a logic circuit and an input interface, where the logic circuit and the input interface are configured to implement any method provided in the sixth aspect. The logic circuit is configured to perform a processing action in a corresponding method, and the input interface is configured to perform a receiving action in a corresponding method.

According to a twenty-fifth aspect, a transmitter apparatus is provided. The apparatus includes a processor, where the processor is coupled to a memory, the memory is configured to store computer-executable instructions, and the processor executes the computer-executable instructions stored in the memory, so that the transmitter apparatus performs any method provided in the first aspect.

In a possible implementation, the memory is located inside the transmitter apparatus.

In a possible implementation, the memory is located outside the transmitter apparatus.

According to a twenty-sixth aspect, a receiver apparatus is provided. The apparatus includes a processor, where the processor is coupled to a memory, the memory is configured to store computer-executable instructions, and the processor executes the computer-executable instructions stored in the memory, so that the receiver apparatus performs any method provided in the second aspect.

In a possible implementation, the memory is located inside the receiver apparatus.

In a possible implementation, the memory is located outside the receiver apparatus.

According to a twenty-seventh aspect, a transmitter apparatus is provided. The apparatus includes a processor, where the processor is coupled to a memory, the memory is configured to store computer-executable instructions, and the processor executes the computer-executable instructions stored in the memory, so that the transmitter apparatus performs any method provided in the third aspect.

In a possible implementation, the memory is located inside the transmitter apparatus.

In a possible implementation, the memory is located outside the transmitter apparatus.

According to a twenty-eighth aspect, a receiver apparatus is provided. The apparatus includes a processor, where the processor is coupled to a memory, the memory is configured to store computer-executable instructions, and the processor executes the computer-executable instructions stored in the memory, so that the receiver apparatus performs any method provided in the fourth aspect.

In a possible implementation, the memory is located inside the receiver apparatus.

In a possible implementation, the memory is located outside the receiver apparatus.

According to a twenty-ninth aspect, a transmitter apparatus is provided. The apparatus includes a processor, where the processor is coupled to a memory, the memory is configured to store computer-executable instructions, and the processor executes the computer-executable instructions stored in the memory, so that the transmitter apparatus performs any method provided in the fifth aspect.

In a possible implementation, the memory is located inside the transmitter apparatus.

In a possible implementation, the memory is located outside the transmitter apparatus.

According to a thirtieth aspect, a receiver apparatus is provided. The apparatus includes a processor, where the processor is coupled to a memory, the memory is configured to store computer-executable instructions, and the processor executes the computer-executable instructions stored in the memory, so that the receiver apparatus performs any method provided in the sixth aspect.

In a possible implementation, the memory is located inside the receiver apparatus.

In a possible implementation, the memory is located outside the receiver apparatus.

According to a thirty-first aspect, a communication system is provided. The system includes the transmitter apparatus provided in the seventh aspect and the receiver apparatus provided in the eighth aspect; or the transmitter apparatus provided in the thirteenth aspect and the receiver apparatus provided in the fourteenth aspect; or the transmitter apparatus provided in the nineteenth aspect and the receiver apparatus provided in the twentieth aspect.

According to a thirty-second aspect, a communication system is provided. The system includes the transmitter apparatus provided in the ninth aspect and the receiver apparatus provided in the tenth aspect; or the transmitter apparatus provided in the fifteenth aspect and the receiver apparatus provided in the sixteenth aspect; or the transmitter apparatus provided in the twenty-first aspect and the receiver apparatus provided in the twenty-second aspect.

According to a thirty-third aspect, a communication system is provided. The system includes the transmitter apparatus provided in the eleventh aspect and the receiver apparatus provided in the twelfth aspect; or the transmitter apparatus provided in the seventeenth aspect and the receiver apparatus provided in the eighteenth aspect; or the transmitter apparatus provided in the twenty-third aspect and the receiver apparatus provided in the twenty-fourth aspect.

According to a thirty-fourth aspect, a computer-readable storage medium is provided. The computer-readable storage medium stores computer instructions. When the computer instructions are run on a computer, the computer performs any method provided in the first aspect.

According to a thirty-fifth aspect, a computer-readable storage medium is provided. The computer-readable storage medium stores computer instructions. When the computer instructions are run on a computer, the computer performs any method provided in the second aspect.

According to a thirty-sixth aspect, a computer-readable storage medium is provided. The computer-readable storage medium stores computer instructions. When the computer instructions are run on a computer, the computer performs any method provided in the third aspect.

According to a thirty-seventh aspect, a computer-readable storage medium is provided. The computer-readable storage medium stores computer instructions. When the computer instructions are run on a computer, the computer performs any method provided in the fourth aspect.

According to a thirty-eighth aspect, a computer-readable storage medium is provided. The computer-readable storage medium stores computer instructions. When the computer instructions are run on a computer, the computer performs any method provided in the fifth aspect.

According to a thirty-ninth aspect, a computer-readable storage medium is provided. The computer-readable storage medium stores computer instructions. When the computer instructions are run on a computer, the computer performs any method provided in the sixth aspect.

According to a fortieth aspect, a computer program product including computer instructions is provided. When the computer instructions are on a computer, the computer is enabled to perform any method provided in the first aspect.

According to a forty-first aspect, a computer program product including computer instructions is provided. When the computer instructions are on a computer, the computer is enabled to perform any method provided in the second aspect.

According to a forty-second aspect, a computer program product including computer instructions is provided. When the computer instructions are on a computer, the computer is enabled to perform any method provided in the third aspect.

According to a forty-third aspect, a computer program product including computer instructions is provided. When the computer instructions are on a computer, the computer is enabled to perform any method provided in the fourth aspect.

According to a forty-fourth aspect, a computer program product including computer instructions is provided. When the computer instructions are on a computer, the computer is enabled to perform any method provided in the fifth aspect.

According to a forty-fifth aspect, a computer program product including computer instructions is provided. When the computer instructions are on a computer, the computer is enabled to perform any method provided in the sixth aspect.

For a technical effect brought by any implementation of the seventh to the forty-fifth aspects, refer to a technical effect brought by a corresponding implementation of the first aspect to the sixth aspect. Details are not described herein again.

It should be noted that various possible implementations of any one of the foregoing aspects may be combined provided that the solutions are not contradictory.

BRIEF DESCRIPTION OF DRAWINGS

FIG. 2 to FIG. 5 each are a schematic composition diagram of a PPDU;

FIG. 11 is a schematic composition diagram of a PPDU according to an embodiment of this application.

DESCRIPTION OF EMBODIMENTS

The following describes technical solutions in embodiments of this application with reference to accompanying drawings in the embodiments of this application. In descriptions of this application, unless otherwise specified, "I" means "or". For example, A/B may represent A or B. The term "and/or" in this specification describes only an association relationship for associated objects and represents that three relationships may exist. For example, A and/or B may represent the following three cases: Only A exists, both A and B exist, and only B exists.

In the descriptions of this application, the term "a plurality of" means two or more than two unless otherwise specified. In addition, to clearly describe the technical solutions in the embodiments of this application, terms such as "first" and "second" are used in the embodiments of this application to distinguish between same items or similar items with basically same functions or purposes. A person skilled in the art may understand that the terms such as "first" and "second" do not limit a quantity or an execution sequence, and the terms such as "first" and "second" do not indicate a definite difference.

Figure 1:
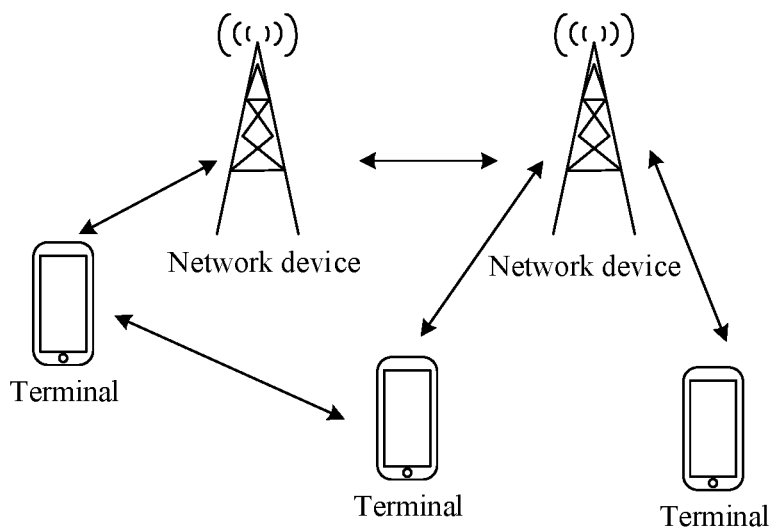
FIG. 1 is a schematic composition diagram of a network architecture.

Refer to FIG. 1. An embodiment of this application provides a communication system. The communication system includes at least one network device and at least one terminal. In this application, a transmitter may be a network device or a terminal, and a receiver may be a network device or a terminal.

The communication system in this embodiment of this application may be a communication system that supports a fourth generation (4G) access technology, for example, a long term evolution (LTE) access technology. Alternatively, the communication system may be a communication system that supports a fifth generation (5G) access technology, for example, a new radio (NR) access technology. Alternatively, the communication system may be a communication system that supports a plurality of wireless technologies, for example, a communication system that supports an LTE technology and an NR technology. Alternatively, the communication system may be a WLAN communication system. In addition, the communication system is also applicable to a future-oriented communication technology.

The network device may be an apparatus that is deployed in a radio access network (RAN) and that provides a wireless communication function for the terminal. For example, the network device may be a base station, and control nodes in various forms (for example, a network controller or a radio controller (for example, a radio controller in a cloud radio access network (CRAN) scenario)). For example, the network device may be macro base stations, micro base stations (which are also referred to as small cells), relay stations, access points (AP), or the like in various forms, or may be an antenna panel of a base station. The control node may be connected to a plurality of base stations, and configure resources for a plurality of terminals covered by the plurality of base stations. In systems using different radio access technologies, names of devices having functions of a base station may vary. For example, the device may be referred to as an evolved NodeB (eNB or eNodeB) in the LTE system, or may be referred to as a next generation node base station (gNB) in the 5G system or the NR system. A specific name of the base station is not limited in this application. The network device may alternatively be a communication server, a router, a switch, a bridge, a computer, a network device in a future evolved public land mobile network (public land mobile network, PLMN), or the like.

The terminal may be a device that provides voice or data connectivity for a user, and may also be referred to as user equipment (UE), a mobile station (mobile station), a subscriber unit, a station, terminal equipment (TE), or the like. For example, the terminal may be a cellular phone, a personal digital assistant (PDA), a wireless modem, a handheld device, a laptop computer, a cordless phone, a wireless local loop (WLL) station, a pad, a smartphone, customer premise equipment (CPE), or a sensor with a network access function. With development of wireless communication technologies, a device that can access the communication system, a device that can communicate with a network side in the communication system, or a device that can communicate with another object by using the communication system may be the terminal in the embodiments of this application, such as a terminal and a vehicle in intelligent transportation, a household device in a smart household, an electricity meter reading instrument or a voltage monitoring instrument in a smart grid, an environment monitoring instrument, a video surveillance instrument in an intelligent security network, or a cash register.

The technical solutions provided in the embodiments of this application may be applied to a plurality of communication scenarios, for example, a machine to machine (M2M) scenario, a macro-micro communication scenario, an enhanced mobile broadband (eMBB) scenario, an ultra-reliable and low-latency communication (URLLC) scenario, and a massive machine-type communication (mMTC) scenario.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that the technical solutions provided in the embodiments of this application are also applicable to a similar technical problem as a network architecture evolves and a new service scenario emerges. For ease of description, an example of a method provided in the embodiments of this application is described by using an example in which the method is applied to a WLAN.

Currently, WLAN protocol standards are 802.11a/b/g, 802.11n, 802.11ac, and 802.11ax from the oldest to the latest. In the WLAN protocol standards, a PPDU (which may also be referred to as a data packet) mainly includes a preamble part and a data part, where the preamble part is used to assist in receiving the data part. The following describes a frame format of a PPDU in each WLAN protocol standard.

(1) Frame Format of the PPDU in 802.11a/b/g

The PPDU in 802.11a/b/g may be referred to as a non-high throughput (Non-HT) PPDU, and mainly refers to a legacy PPDU structure in 802.11a/b/g and the like.

Figure 2:
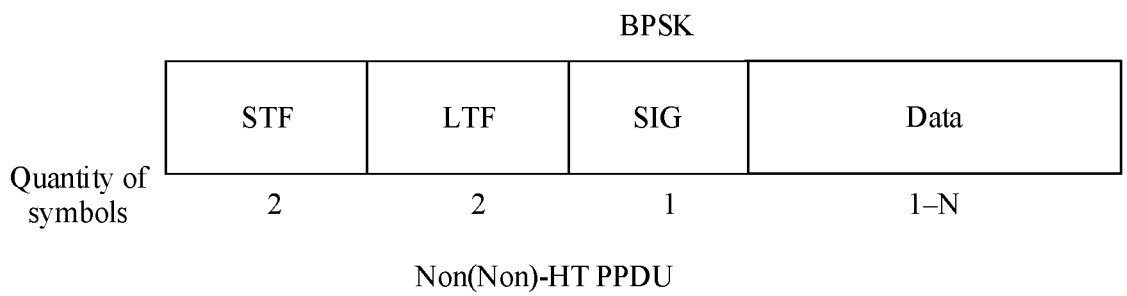

Refer to FIG. 2. The non-HT PPDU includes a short training field (STF), a long training field (LTF), a signaling field (SIG), and data. The STF, the LTF, and the SIG all belong to a preamble part (which may be referred to as a Non-HT preamble). For a quantity of orthogonal frequency division multiplexing (OFDM) symbols occupied by each field, refer to FIG. 2. A modulation scheme of the SIG is binary phase shift keying (BPSK) modulation, in other words, the SIG uses BPSK. Descriptions in other parts in this specification are similar. In FIG. 2 to FIG. 5, FIG. 6A and FIG. 6B, FIG. 9A to FIG. 9C, and FIG. 12A to FIG. 12C of this application, an OFDM symbol is referred to as a symbol for short. N in FIG. 2 to FIG. 5 of this application is an integer greater than 0. A value of M in FIG. 5 is an integer greater than 0.

(2) Frame Format of the PPDU in 802.11n

The PPDU in 802.11n may be referred to as a high throughput (HT) PPDU. In 802.11n, two frame formats of an HT PPDU are introduced. The first may be referred to as an HT mixed format (HT MF). The second may be referred to as an HT greenfield format (HT GF).

Figure 3:
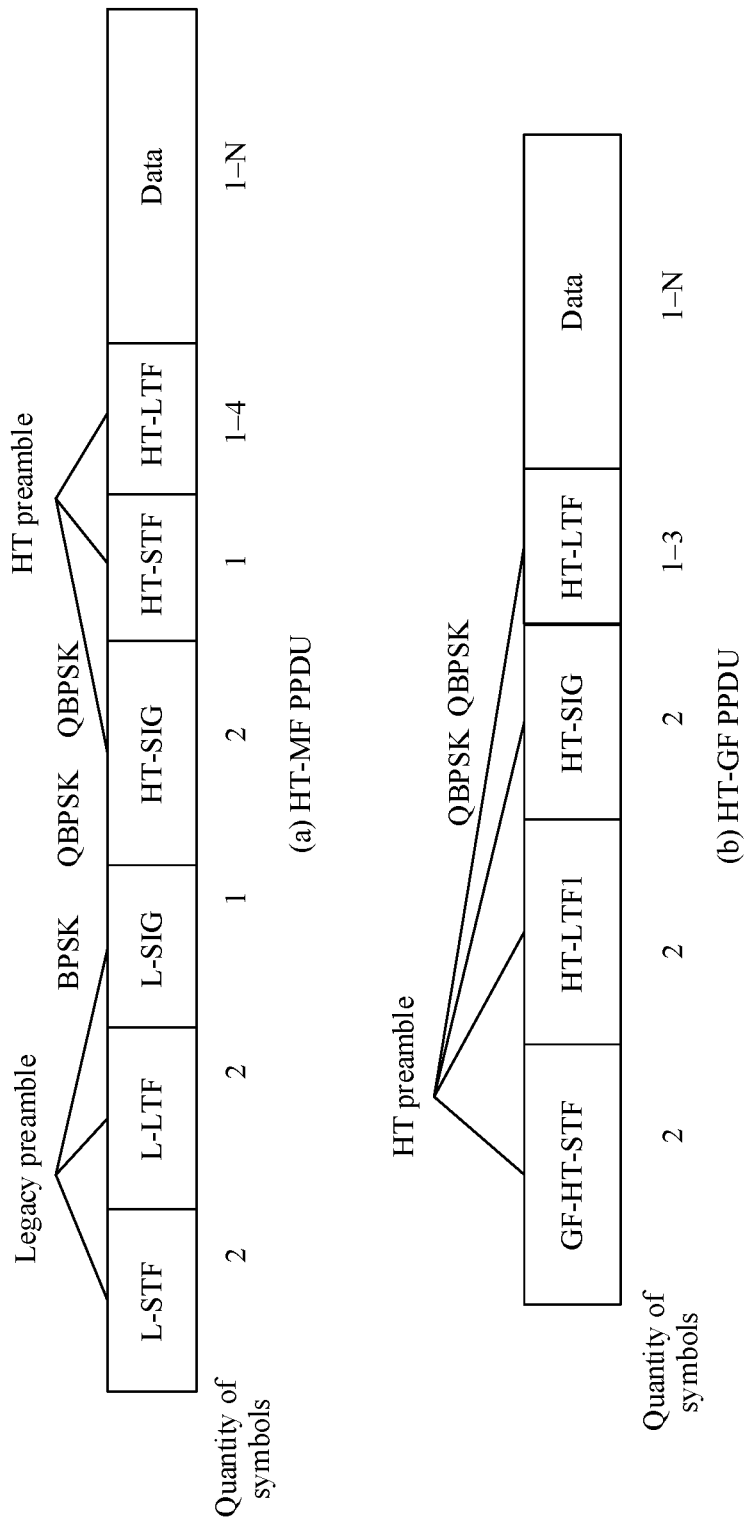

Refer to (a) in FIG. 3. An HT MF PPDU includes an L-STF, an L-LTF, an L-SIG, an HT-SIG, an HT-STF, an HT-LTF, and data. The L-STF, the L-LTF, and the L-SIG belong to a legacy preamble part, and the HT-SIG, the HT-STF, and the HT-LTF belong to an HT preamble part. The legacy preamble part and the HT preamble part may be referred to as an HT MF preamble. "L-" in the L-STF, the L-LTF, and the L-SIG represents a legacy field and is used to ensure that a device that supports updated standards coexists with a legacy device. For a quantity of OFDM symbols occupied by each field, refer to (a) in FIG. 3. A modulation scheme of the L-SIG is BPSK, and a modulation scheme of each OFDM symbol in the HT-SIG is quadrature binary phase shift keying (QBPSK) modulation.

Refer to (b) in FIG. 3. An HT GF PPDU includes a GF (greenfield)-HT-STF, an HT-LTF1, an HT-SIG, an HT-LTF, and data. The GF (greenfield)-HT-STF, the HT-LTF1, the HT-SIG, and the HT-LTF belong to an HT preamble part (which may also be referred to as an HT GF preamble). For a quantity of OFDM symbols occupied by each field, refer to (b) in FIG. 3. A modulation scheme of each OFDM symbol in the HT-SIG is QBPSK modulation. To reduce overheads of the PPDU, the HT GF PPDU no longer includes a legacy preamble part. Therefore, the HT GF PPDU cannot coexist with a legacy device.

(3) Frame Format of the PPDU in 802.11Ac

The PPDU in 802.11ac may be referred to as a very high throughput (VHT) PPDU.

Figure 4:
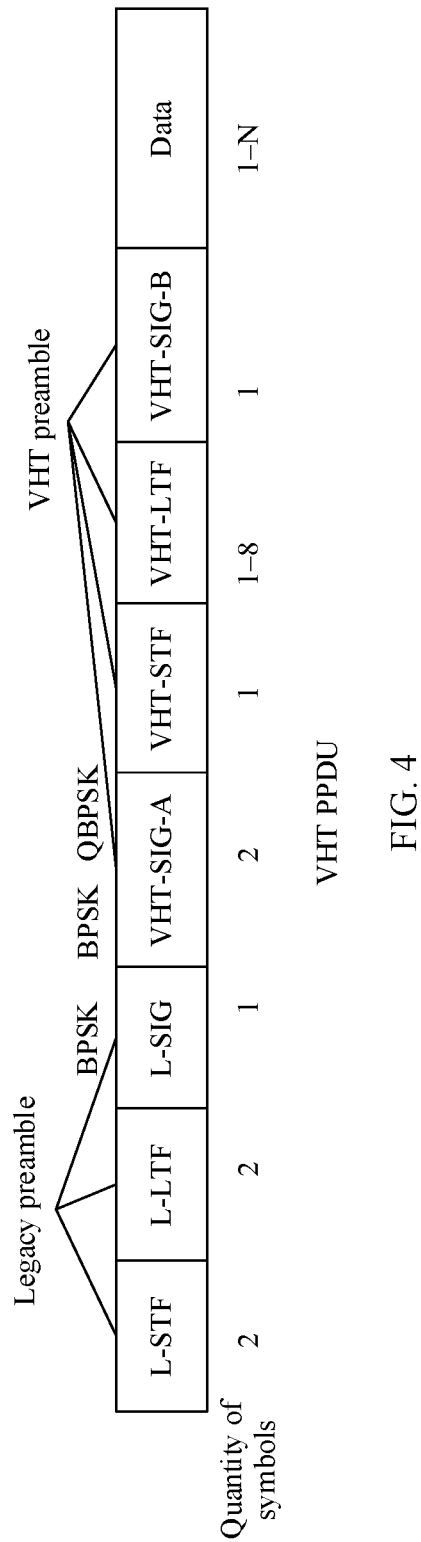

Refer to FIG. 4. In addition to a legacy preamble part, the VHT PPDU further includes a VHT-SIG-A, a VHT-STF, a VHT-LTF, a VHT-SIG-B, and data. The VHT-SIG-A, the VHT-STF, the VHT-LTF, and the VHT-SIG-B belong to a VHT preamble part. For a quantity of OFDM symbols occupied by each field, refer to FIG. 4. A modulation scheme of the first OFDM symbol in the VHT-SIG-A and the L-SIG is both BPSK modulation, and a modulation scheme of the second OFDM symbol in the VHT-SIG-A is QBPSK modulation.

(4) Frame Format of the PPDU in 802.11Ax

A PPDU in 802.11ax may be referred to as a high efficiency (HE) PPDU. There are four types of HE PPDUs: an HE single-user (SU) PPDU, an HE multi-user (MU) PPDU, an HE trigger-based (TB) PPDU, and an HE extended range (ER) SU PPDU.

Refer to (a) to (d) in FIG. 5. The four HE PPDUs each include a legacy preamble part, a repeated L-SIG (a repeated L-SIG, namely, an RL-SIG in (a) to (d) in FIG. 5), an HE-SIG-A, an HE-STF, an HE-LTF, data, and packet extension (PE). The HE MU PPDU further includes an HE-SIG-B. For a quantity of OFDM symbols occupied by each field, refer to (a) to (d) in FIG. 5. In the four HE PPDUs, a modulation scheme of the L-SIG and the RL-SIG is BPSK. In the HE SU PPDU, the HE MU PPDU, and the HE TB PPDU, a modulation scheme of each OFDM symbol in the HE-SIG-A is BPSK modulation. In the HE ER SU PPDU, a modulation scheme of the first, third, and fourth OFDM symbols in the HE-SIG-A is BPSK modulation, and a modulation scheme of the second OFDM symbol in the HE-SIG-A is QBPSK modulation.

The preamble parts of the HE SU PPDU, the HE MU PPDU, the HE TB PPDU, and the HE ER SU PPDU may respectively be referred to as an HE SU preamble, an HE MU preamble, an HE TB preamble, and an HE ER SU preamble.

It should be noted that, a receiver that supports updated protocol standards may identify a PPDU frame format in a protocol standard of a received PPDU through automatic detection, to correctly interpret information in the received PPDU. It should be noted that each of the L-SIGs in the four HE PPDUs includes a rate field and a length field. The rate field is set to 6 Mbit/s. A remainder obtained after a value that is set as the length field in the HE SU PPDU and the HE TB PPDU modulo 3 is 1. A remainder obtained after a value that is set as the length field in the HE MU PPDU and the HE ER SU PPDU modulo 3 is 2. In addition, each of the HE-SIG-As in the HE SU PPDU and the HE TB PPDU includes a format field, and the field is used to indicate whether the PPDU is an HE SU PPDU or an HE TB PPDU. Based on the foregoing descriptions, a receiver that supports the 802.11ax protocol standard (which may be referred to as an HE receiver) is used as an example. For a process of automatic detection of the receiver, refer to FIG. 6A and FIG. 6B. The specific process includes the following steps.

(1) Detect an HT-GF preamble. Specifically, whether the first OFDM symbol following the LTF uses QBPSK is detected. If yes, the detected HT-GF preamble is the HT-GF preamble. If no, a branch 1 or a branch 2 continues to be used for detection.

(2) In the branch 1, detect an RL-SIG. Specifically, step (2) includes: receiving the first OFDM symbol and the second OFDM symbol following the L-LTF, and determining whether the first OFDM symbol and the second OFDM symbol following the L-LTF are the same. Because only the HE PPDU in the foregoing PPDUs has the RL-SIG, if that the first OFDM symbol and the second OFDM symbol following the L-LTF are the same is detected, it indicates that a received PPDU is an HE PPDU, and step (3) is performed subsequently. If that the first OFDM symbol and the second OFDM symbol following the L-LTF are the same is not detected, the branch 2 is switched to.

(3) Receive an L-SIG. Specifically, step (3) includes: receiving and combining the L-SIG and the RL-SIG; decoding and checking a parity bit, and determining whether a rate field in the L-SIG is set to 6 Mbit/s; and if the decoding succeeds, the parity check passes, and the rate check passes (in other words, that the rate field in the L-SIG is set to 6 Mbit/s is determined), performing step (4); or if the parity check or the rate check fails (in other words, the rate field in the L-SIG is not set to 6 Mbit/s), switching to the branch 2.

(4) Analyze the value of the length field in the L-SIG. If a remainder obtained after the value of the length field is divided by 3 is 1, it indicates that the received PPDU is an HE SU PPDU or an HE TB PPDU, and step (5) is performed. If a remainder obtained after the value of the length field is divided by 3 is 2, it indicates that the received PPDU is an HE MU PPDU or an HE ER SU PPDU, and step (8) is performed. If a remainder obtained after the value of the length field is divided by 3 is 0, the branch 2 is switched to.

(5) Detect an HE-SIG-A in an HE SU preamble or an HE TB preamble, and receive the HE-SIG-A.

(6) Perform receiving (which may also be referred to as parsing) on the HE-SIG-A, and perform a CRC (cyclic redundancy code) test (in other words, perform CRC check). If the CRC test passes, step (7) is performed.

(7) Analyze the HE-SIG-A. Step (7) specifically includes: checking a format field in the HE-SIG-A; and if the format field indicates SU, determining that the HE-SIG-A in the HE SU preamble is detected; or if the format field indicates TB, determining that the HE-SIG-A in the HE TB preamble is received.

(8) Analyze a phase of the second OFDM symbol in the HE-SIG-A. If the phase of the second OFDM symbol in the HE-SIG-A is determined to be QBPSK, it is determined that an HE-SIG-A in an HE ER SU preamble is detected, and the HE-SIG-A is received. If the phase of the second OFDM symbol in the HE-SIG-A is determined to be BPSK, it is determined that an HE-SIG-A in an HE MU preamble is detected, and the HE-SIG-A is received.

(9) In the branch 2, an SIG in the PPDU may be detected. If a modulation scheme of the first OFDM symbol following the L-SIG is QBPSK modulation, it is determined that a type of the preamble is an HT-MF preamble. If a modulation scheme of the first OFDM symbol following the L-SIG is BPSK modulation, and the modulation scheme of the second OFDM symbol is QBPSK modulation, it is determined that a type of the preamble is a VHT preamble. Otherwise, if that the preamble is not an HE preamble is determined through branch 1, it is determined that the preamble is a Non-HT preamble.

It should be noted that an execution sequence between step (1) to step (9) is not strictly limited. For example, the receiver may first perform steps in the branch 2 and then perform steps in the branch 1. Alternatively, steps in the branch 2 are first performed, then steps in the branch 1 are performed, and then steps in the branch 2 are performed again. For example, whether the preamble is a VHT preamble or an HT-MF preamble is first determined, then whether the preamble is an HE preamble is determined, and then whether the preamble is a non-HT preamble is determined.

A PPDU in a next-generation standard (the standard corresponds to the 802.11be working group) of the latest WLAN protocol standard 802.11ax may be referred to as an EHT PPDU, and a PPDU in a subsequent version of the EHT standard may be referred to as an EHT+ PPDU. To enable the receiver to identify the EHT PPDU or the EHT+ PPDU, and not identify the other several types of PPDUs as the EHT PPDU or the EHT+ PPDU, this embodiment of this application provides the following three solutions. The solutions are denoted as a solution 1, a solution 2, and a solution 3.

Solution 1

Figure 7:
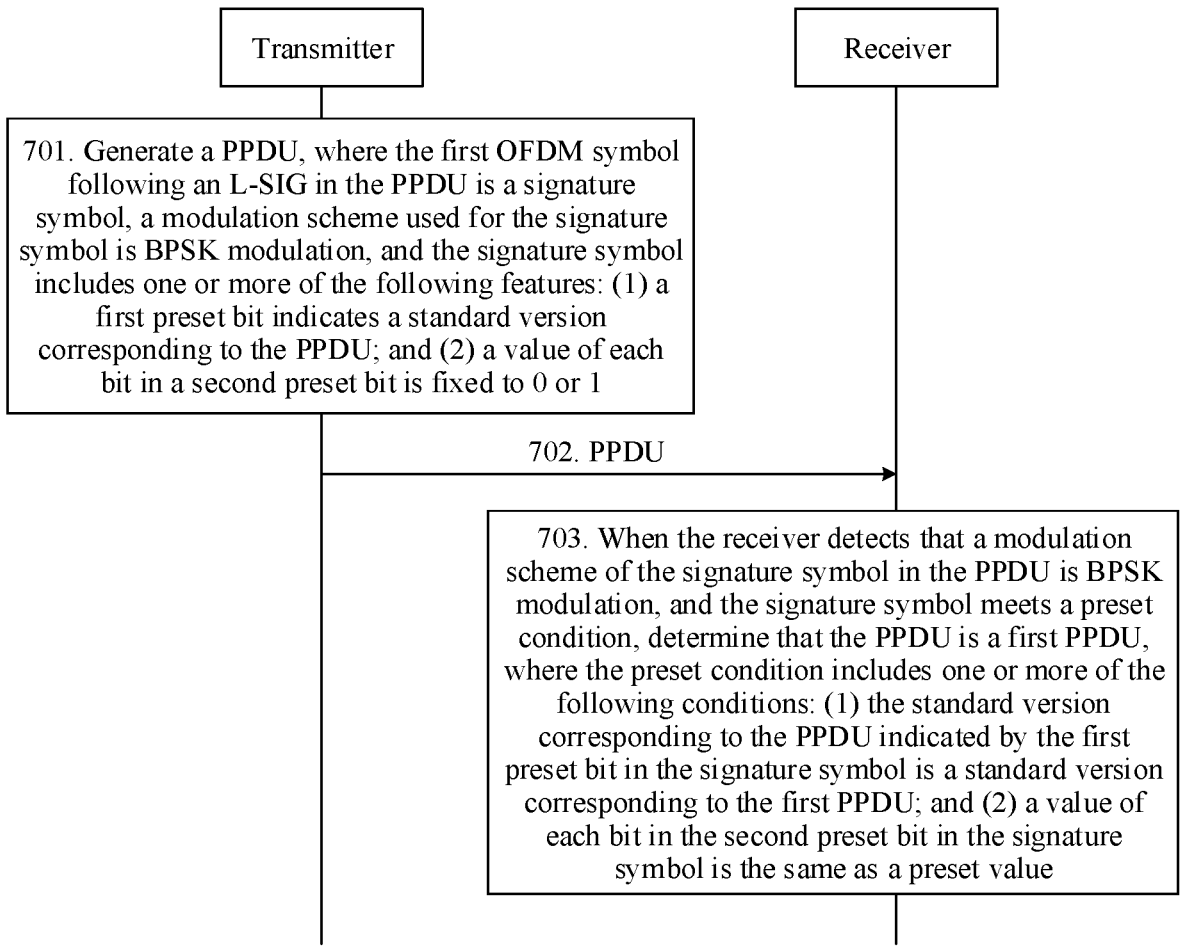
FIG. 7 is a schematic flowchart of a data sending and receiving method according to an embodiment of this application.

The solution 1 provides a data sending and receiving method. As shown in FIG. 7, the method includes the following steps.

701. A transmitter generates a PPDU, where the first OFDM symbol following an L-SIG in the PPDU is a signature symbol (Signature symbol), a modulation scheme of the signature symbol is BPSK modulation, and the signature symbol includes one or more of the following features: (1) a first preset bit indicates a standard version corresponding to the PPDU; and (2) a value of each bit in a second preset bit is 0 or 1.

In the solution 1, the PPDU in which the first OFDM symbol following the L-SIG is a signature symbol is an EHT PPDU or an EHT+ PPDU.

The first preset bit and/or the second preset bit may include one or more bits. When the first preset bit and/or the second preset bit include/includes a plurality of bits, the plurality of bits may be consecutive bits, or may be inconsecutive bits. This is not limited. The first preset bit and/or the second preset bit may be preset, predefined, determined by a transceiver through negotiation, or specified in a protocol. The first preset bit and/or the second preset bit may be referred to as a signature field, and the signature field is used by a receiver to identify a frame format of a received PPDU. For example, the signature field may be used to indicate that a PPDU to which the signature field belongs is an EHT PPDU or an EHT+ PPDU. A bit sequence in the signature field may be referred to as a feature sequence (which may alternatively be referred to as a signature sequence).

In the signature symbol, a part other than the feature sequence may be an information bit part, or a part other than the feature sequence, a CRC, and a tail bit may be an information bit part. Information in the first preset bit may be considered as a part of a bit sequence, or may be considered as a part of information bits.

Figure 8:
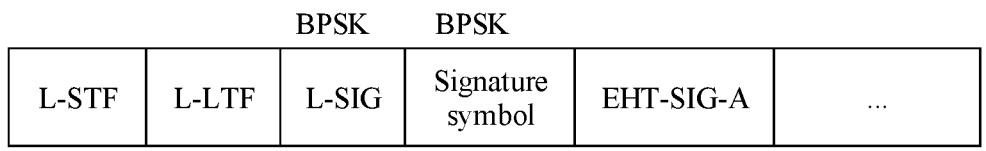
FIG. 8 is a schematic composition diagram of a PPDU according to an embodiment of this application.

An L-SIG in an EHT PPDU or an EHT+ PPDU may alternatively be BPSK modulated to coexist with a legacy device. For example, for some fields in a preamble part in an EHT PPDU, refer to FIG. 8.

702. The transmitter sends the PPDU to a receiver. Correspondingly, the receiver receives the PPDU.

703. When the receiver detects that a modulation scheme of the signature symbol in the PPDU is BPSK modulation, and the signature symbol meets a preset condition, the receiver determines that the PPDU is a first PPDU. The preset condition includes one or more of the following conditions: (1) the standard version corresponding to the PPDU indicated by the first preset bit in the signature symbol is a standard version corresponding to the first PPDU; and (2) a value of each bit in the second preset bit in the signature symbol is the same as a preset value.

The first PPDU is an EHT PPDU or an EHT+ PPDU.

Because the modulation scheme of the signature symbol in the received PPDU is BPSK, yet a modulation scheme of a first OFDM symbol following an L-SIG in an HT PPDU is QBPSK, the receiver may determine, based on the modulation scheme of the signature symbol, that the received PPDU is not an HT PPDU. That an EHT PPDU or an EHT+ PPDU is identified by the receiver as an HT-MF PPDU or an HT-GF PPDU causes poor coexistence, which is prone to cause interference to the EHT PPDU or the EHT+ PPDU. Therefore, that the receiver identifies the EHT PPDU or the EHT+ PPDU as the HT-MF PPDU or the HT-GF PPDU can be avoided by using the modulation scheme of the signature symbol, and coexistence is achieved.

Further, the receiver may determine whether the signature symbol meets the condition (1) and/or the condition (2), to determine whether the received PPDU is the first PPDU.

For example, the first preset bit may be a part of or all bits in b0 to b3, bi in the solution 1 is a bit with an index of i in the signature symbol, a latter bit in the signature symbol indicates a larger index, and i is an integer greater than or equal to 0. For example, b0 and b1 may be used to indicate a standard version. Specifically, 00 represents 11 be (in this case, the PPDU is an EHT PPDU), 01 represents a next generation of 11 be, 10 represents a generation after next of 11be, 11 represents a generation after the generation after next of 11be, and so on. In this case, if the receiver determines that b0b1 is 00, the receiver determines that the standard version corresponding to the received PPDU is 11be. Currently, subsequent standard versions are to be determined. Therefore, indications 01, 10, and 11 can be reserved, as is shown in Table 1 below.

TABLE 1

| b0b1 | Standard version |
|------|------------------|
| 00   | 11be             |
| 01   | Reserved         |
| 10   | Reserved         |
| 11   | Reserved         |

It should be noted that, because the standard version may indirectly indicate the frame format of the PPDU, "a first preset bit indicates a standard version corresponding to the PPDU" may alternatively be described as "a first preset bit indicates a frame format corresponding to the PPDU". Correspondingly, "the standard version corresponding to the PPDU indicated by the first preset bit in the signature symbol is a standard version corresponding to the first PPDU" may alternatively be described as "the frame format corresponding to the PPDU indicated by the first preset bit in the signature symbol is a frame format corresponding to the first PPDU".

At the transmitter, optionally, the second preset bit includes one or more of b2, b3, b4, and b10, where b2, b3, b4, and b10 all refer to uncoded bits, and b2=0, b3=0, b4=1, and b10=1. At the receiver, the second preset bit includes one or more of b2, b3, b4, and b10, where a preset value of b2 is 0, a preset value of b3 is 0, a preset value of b4 is 1, and a preset value of b10 is 1. For example, it is assumed that the second preset bit includes b2 and b3, and if the receiver determines that values of b2 and b3 in the signature symbol in the received PPDU are 0 and 0 respectively, the receiver determines that a value of each bit in the second preset bit is the same as a preset value of the bit.

The first OFDM symbol following an L-SIG in an HE PPDU is an RL-SIG. The first OFDM symbol following an L-SIG in a VHT PPDU is the first OFDM symbol (which may be denoted as a VHT-SIG-A1) in a VHT-SIG-A. One or more bits in the signature symbol may be set to be different from those in the RL-SIG or the VHT-SIG-A1, to distinguish from the HE PPDU or the VHT PPDU. Specifically, because a reserved bit (b2) in the VHT-SIG-A1 needs to be set to 1, if b2 in the signature symbol in the EHT PPDU or the EHT+ PPDU is set to 0, the EHT PPDU or the EHT+ PPDU can be distinguished from the VHT PPDU. Because a rate field (b3) in the RL-SIG needs to be set to 1, if b3 in the signature symbol in the EHT PPDU or the EHT+ PPDU is set to 0, the EHT PPDU or the EHT+ PPDU can be distinguished from the HE PPDU. Because a reserved bit (b4) in the RL-SIG needs to be set to 0, if b4 in the signature symbol in the EHT PPDU or the EHT+ PPDU is set to 1, the EHT PPDU or the EHT+ PPDU can be distinguished from the HE PPDU. When MU-MIMO transmission is performed, b10 in the VHT-SIG-A1 needs to be set to 0. Therefore, if b10 in the signature symbol in the EHT PPDU or the EHT+ PPDU is set to 1, the EHT PPDU or the EHT+ PPDU can be distinguished from the VHT PPDU.

It should be noted that a specific condition/specific conditions used by the receiver to determine whether the received PPDU is the first PPDU depends/depend on implementation of the transmitter. Generally, when the signature symbol of the transmitter has a feature/features, the receiver uses a condition/conditions corresponding to the feature/features to perform determining. For example, if the signature symbol of the transmitter includes the feature (1), the receiver performs determining by using the condition (1) corresponding to the feature (1). If the signature symbol of the transmitter includes the feature (2), the receiver performs determining by using the condition (2) corresponding to the feature (2). If the signature symbol of the transmitter includes the feature (1) and the feature (2), the receiver performs determining by using the condition (1) and the condition (2) corresponding to the feature (1) and the feature (2).

At the transmitter, optionally, the signature symbol further includes one or more of the following features: (3) a CRC in a third preset bit is used to check a part of or all bits in the signature symbol (for example, bits in the signature symbol other than the CRC and a tail bit); and (4) a tail bit is used to end binary convolution code (binary convolution code, BCC) encoding, where the signature symbol uses the BCC encoding. In this case, before the receiver determines that the PPDU is the first PPDU, the method further includes: The receiver decodes the signature symbol based on the tail bit in the signature symbol, where a check on a part of or all bits in the signature symbol (for example, bits in the signature symbol other than the CRC and the tail bit) by using the CRC in the third preset bit in the signature symbol passes.

Because the VHT-SIG-A1 in the VHT PPDU does not have a CRC or a tail bit, the EHT PPDU or the EHT+ PPDU can be distinguished from the VHT PPDU by carrying the CRC and/or the tail bit.

The third preset bit may include one or more bits. The third preset bit may be preset, predefined, determined by a transceiver through negotiation, or specified in a protocol. For example, the third preset bit may be b14 to b17 in the signature symbol, and the CRC in b14 to b17 may be used to perform a check on b0 to b13. It should be noted that, in different PPDU frame formats, a quantity of bits and/or locations of the bits occupied by a CRC are generally different. Therefore, if the check passes, it indicates that the signature symbol is a signature symbol in an EHT PPDU or an EHT+ PPDU. Therefore, it may be further determined that the received PPDU is an EHT PPDU or an EHT+ PPDU. In addition, if the PPDU received by the receiver is not the first PPDU, there is a high probability that decoding and CRC check performed on the first symbol following the L-SIG in a manner where the first symbol is assumed to be the signature symbol fail. Therefore, accuracy of identifying the first PPDU is improved.

Optionally, a quantity of bits and/or locations of the bits occupied by the CRC in the signature symbol are different from a quantity of bits and/or locations of the bits occupied by a parity bit in an RL-SIG in the HE PPDU. The parity bit in the RL-SIG in the HE PPDU may be considered as a special CRC. Because the parity bit in the RL-SIG in the HE PPDU occupies only one bit, the EHT PPDU or the EHT+ PPDU can be distinguished from the HE PPDU by setting a plurality of bits in the CRC. The EHT PPDU or the EHT+ PPDU may alternatively be distinguished from the HE PPDU by setting a location different from that of the parity bit.

Based on the foregoing descriptions, the following summarizes features of the signature symbol.

First, fields in the RL-SIG in the HE PPDU sequentially include a rate (rate) field, a reserved (Reserved) field, a length (Length) field, a parity bit (Parity) field, and a tail bit (Tail) field. For bits occupied by these fields, refer to Table 2. Fields in the VHT-SIG-A1 in the VHT PPDU sequentially include: a bandwidth (Bandwidth) field, a reserved (Reserved) field, a space time block coding (space time block coding, STBC) field, a group identifier (Group ID) field, a number of space time streams (number of space time streams, NSTS)/partial association identifier (partial association identifier, PAID) field, a transmit opportunity power save_NOTALLOWED (transmit opportunity power save_NOTALLOWED, TXOP_PS_NOT_ALLOWED) field, and a reserved (Reserved) field. For bits occupied by these fields, refer to Table 2.

TABLE 2

| | RL-SIG in an HE PPDU | | VHT-SIG-A1 in a VHT PPDU | |
| --- | --- | --- | --- | --- |
| Bit | Field | Quantity of bits | Field | Quantity of bits |
| 0 | Rate | 4 | Bandwidth | 2 |
| 1 | | | | |
| 2 | | | Reserved | 1 |
| 3 | | | STBC | 1 |
| 4 | Reserved | 1 | Group identifier | 6 |
| 5 | Length | 12 | | |
| 6 | | | | |
| 7 | | | | |
| 8 | | | | |
| 9 | | | | |
| 10 | | | NSTS/PAID | |
| 11 | | | | |
| 12 | | | | |
| 13 | | | | |
| 14 | | | | |
| 15 | | | | |
| 16 | | | | |
| 17 | Parity bit | 1 | | |
| 18 | Tail bit | 6 | | |
| 19 | | | | |
| 20 | | | | |
| 21 | | | | |
| 22 | | | TXOP_PS_NOT_ALLOWED | 1 |
| 23 | | | Reserved | 1 |

To distinguish the EHT PPDU or the EHT+ PPDU from the HE PPDU and the VHT PPDU, the signature symbol in the solution 1 may have one or more of features shown in Table 3. It should be noted that Table 3 is merely an example. During actual implementation, bits corresponding to a feature may be different from those in Table 3. For example, the first preset bit may not be b0 to b3, and may be another bit, and the CRC may not be located in b14 to b17, and may be in another location. A specific meaning of a feature may also be different from that in Table 3, and is based on a specific scenario.

TABLE 3

Signature symbol

| Bit | Field | Quantity of bits | Feature |
|---|---|---|---|
| 0 | Part of a feature sequence/Standard version | 4 | A part of or all bits in b0 to b3 are used to indicate a PPDU format of a subsequent different standard version. |
| 1 | | | |
| 2 | | | b2 in the signature symbol is set to 0. (A reserved bit b2 in a VHT-SIG-A1 needs to be set to 1.) |
| 3 | | | b3 in the signature symbol is set to 0. (A rate field b3 in an RL-SIG is 1.) |
| 4 | Part of the feature sequence | 1 | b4 in the signature symbol is set to 1. (A reserved bit b4 in an RL-SIG needs to be set to 0.) |
| 5 | Information bits/Part of the feature sequence | 5 | A fixed part of or all bits are used as a signature field or used to transfer information. A fixed part may be preferably set to 1, and is used to reduce a PAPR of the entire OFDM symbol. |
| 6 | | | |
| 7 | | | |
| 8 | | | |
| 9 | | | |
| 10 | Part of the feature sequence | 1 | b10 in the signature symbol is set to 1. (When MU-MIMO transmission is performed, b10 in a VHT PPDU is set to 0.) |
| 11 | Information bits/Part of the feature sequence | 3 | A fixed part of or all bits are used as a signature field or used to transfer information. |
| 12 | | | |
| 13 | | | |
| 14 | CRC | 4 | The CRC is used to verify a part of or all information in the signature symbol. A quantity of bits and positions of the bits are to be determined. |
| 15 | | | |
| 16 | | | |
| 17 | | | |
| 18 | Tail bit | 6 | The tail bit is used to end BCC encoding. |
| 19 | | | |
| 20 | | | |
| 21 | | | |
| 22 | | | |
| 23 | | | |

Note:
The PAPR refers to a peak to average power ratio (peak to average power ratio).

It should be noted that all features in the signature symbol in Table 3 refer to features in the signature symbol before encoding.

In addition, the receiver may further determine, by using a feature of an OFDM symbol other than the signature symbol, whether the received PPDU is the first PPDU, which is specifically described in the following case 1 and case 2 separately.

Case 1: Whether the received PPDU is the first PPDU is further determined by using a modulation scheme of an OFDM symbol following the signature symbol.

In the case 1, in a possible implementation, the modulation scheme of the OFDM symbol following the signature symbol is BPSK modulation, and the preset condition further includes: determining that the modulation scheme of the OFDM symbol following the signature symbol is BPSK modulation. In this case, for the transmitter and the receiver, the modulation scheme of the OFDM symbol following the signature symbol in the first PPDU may be preconfigured, predefined, or determined through negotiation in advance to be BPSK modulation. In this case, if the receiver determines that the modulation scheme of the OFDM symbol following the signature symbol in the received PPDU is BPSK modulation, the receiver may further determine that the received PPDU is the first PPDU.

In the case 1, in another possible implementation, the modulation scheme of the OFDM symbol following the signature symbol is QBPSK modulation, and the preset condition further includes: determining that the modulation scheme of the OFDM symbol following the signature symbol is QBPSK modulation. In this case, for the transmitter and the receiver, the modulation scheme of the OFDM symbol following the signature symbol in the first PPDU may be preconfigured, predefined, or determined through negotiation in advance to be QBPSK modulation. In this case, if the receiver determines that the modulation scheme of the OFDM symbol following the signature symbol in the received PPDU is QBPSK modulation, the receiver may further determine that the received PPDU is the first PPDU.

Case 2: Whether the received PPDU is the first PPDU is further determined by using a value of a length field in the L-SIG in the PPDU.

In the case 2, in a possible implementation, a remainder obtained after the value of the length field in the L-SIG in the PPDU modulo 3 is 1 or 2, and the preset condition further includes: determining that the remainder obtained after the value of the length field in the L-SIG in the PPDU modulo 3 is 1 or 2. In this case, for the transmitter and the receiver, that a remainder obtained after a value of a length field in an L-SIG in the first PPDU modulo 3 is 1 or 2 may be preconfigured, predefined, or determined through negotiation in advance. In this case, if the receiver determines that the remainder obtained after the value of the length field in the L-SIG in the PPDU modulo 3 is 1 or 2, the receiver may further determine that the received PPDU is the first PPDU.

In the case 2, in another possible implementation, a remainder obtained after the value of the length field in the L-SIG in the PPDU modulo 3 is 0, and the preset condition further includes: determining that the remainder obtained after the value of the length field in the L-SIG in the PPDU modulo 3 is 0. In this case, for the transmitter and the receiver, that a remainder obtained after a value of a length field in an L-SIG in the first PPDU modulo 3 is 0 may be preconfigured, predefined, or determined through negotiation in advance. In this case, if the receiver determines that the remainder obtained after the value of the length field in the L-SIG in the PPDU modulo 3 is 0, the receiver may further determine that the received PPDU is the first PPDU.

It should be noted that, in the foregoing method, the more preset conditions met by the PPDU received by the receiver, the more likely that the received PPDU is the first PPDU is, and the higher determining accuracy of the receiver is.

To learn more clearly about actions of the receiver, the following uses an example to describe a processing procedure of the receiver. In this example, a remainder obtained after a value of a length field in an L-SIG in the first PPDU modulo 3 is not 0, and the first preset bit is located in the information bits rather than in the signature field. Specifically, refer to FIG. 9A to FIG. 9C.

Figure 6A:
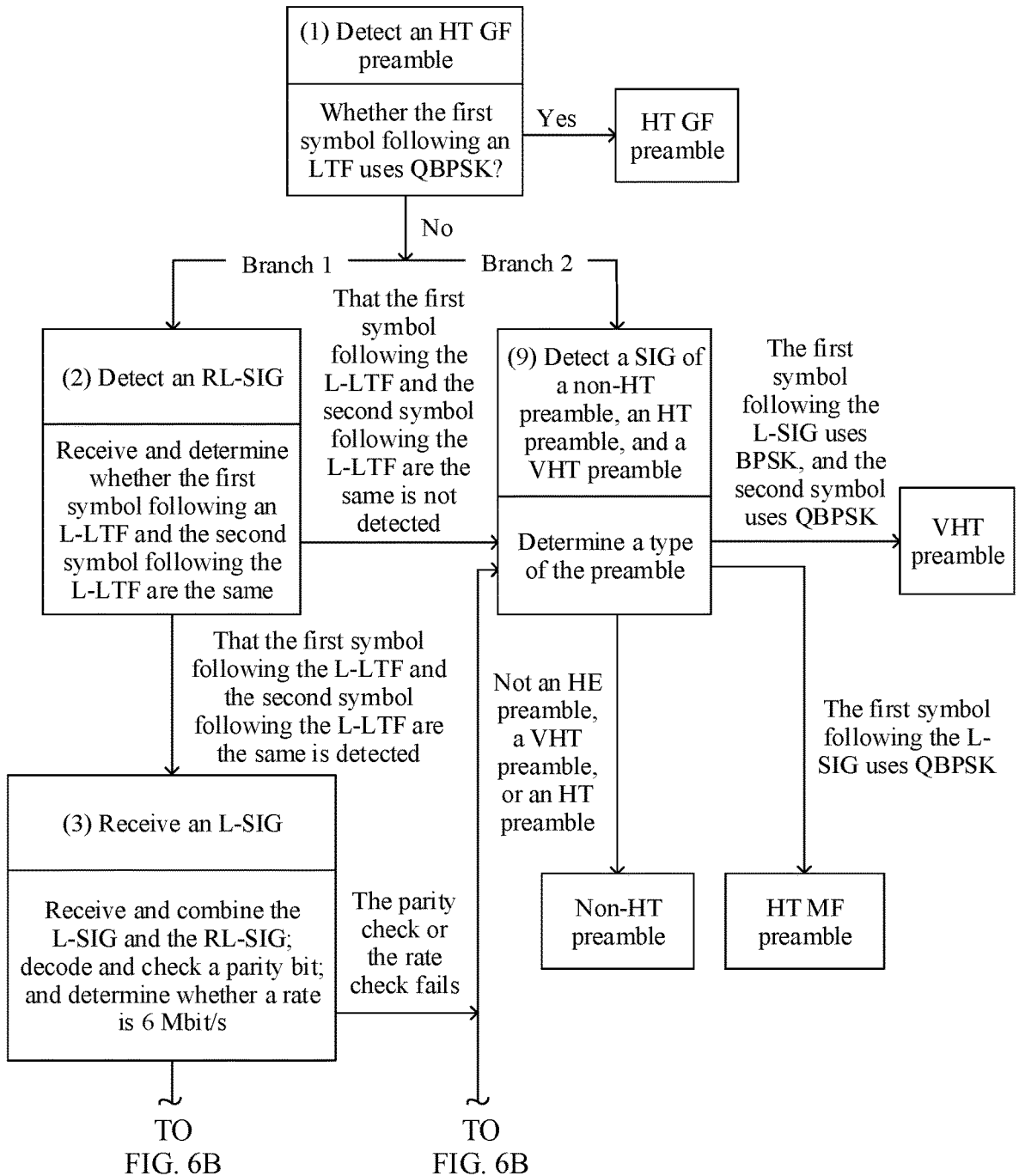
FIG. 6A and FIG. 6B are a flowchart of automatic detection of a receiver.
Figure 6B:
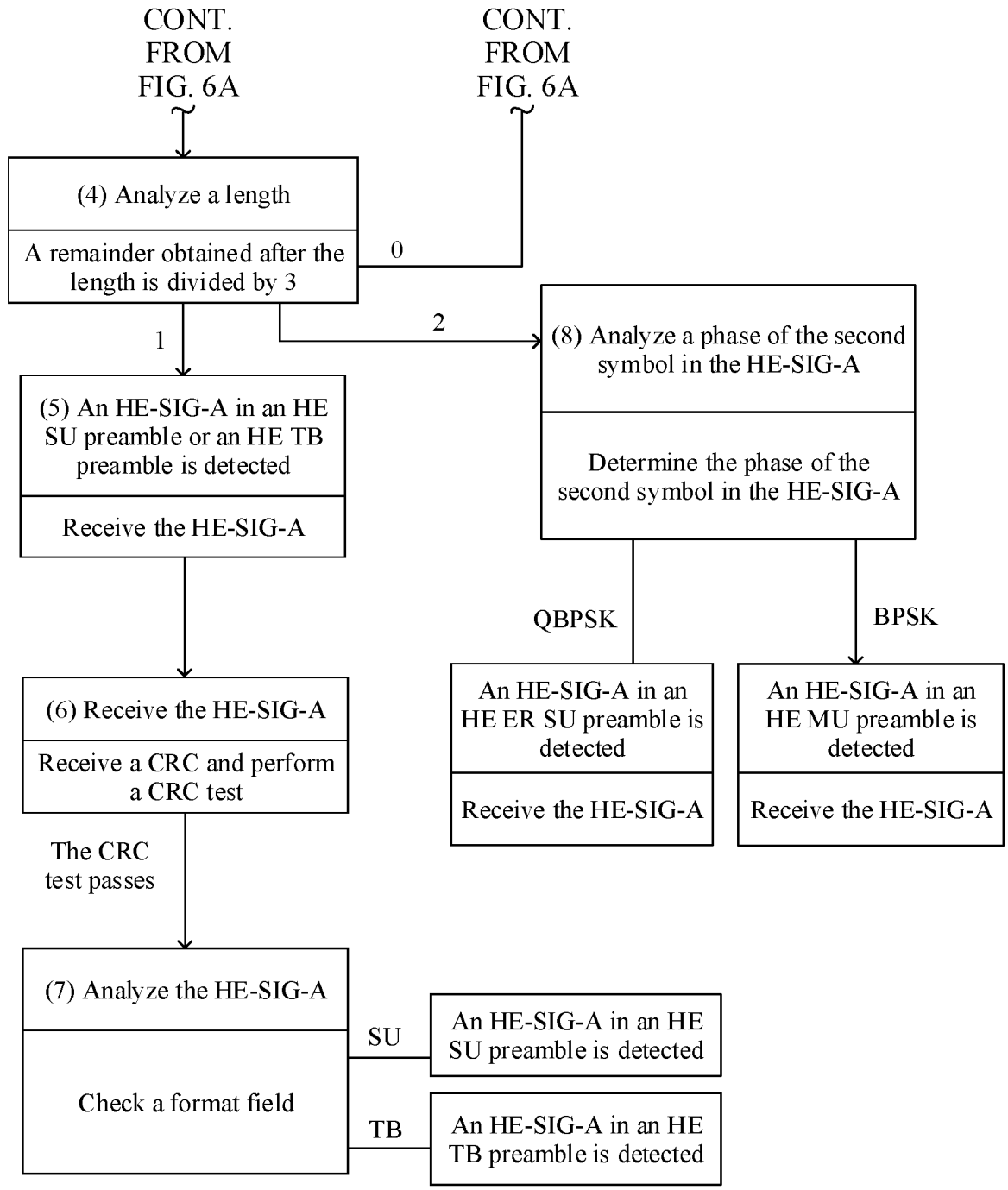
Figure 9A:
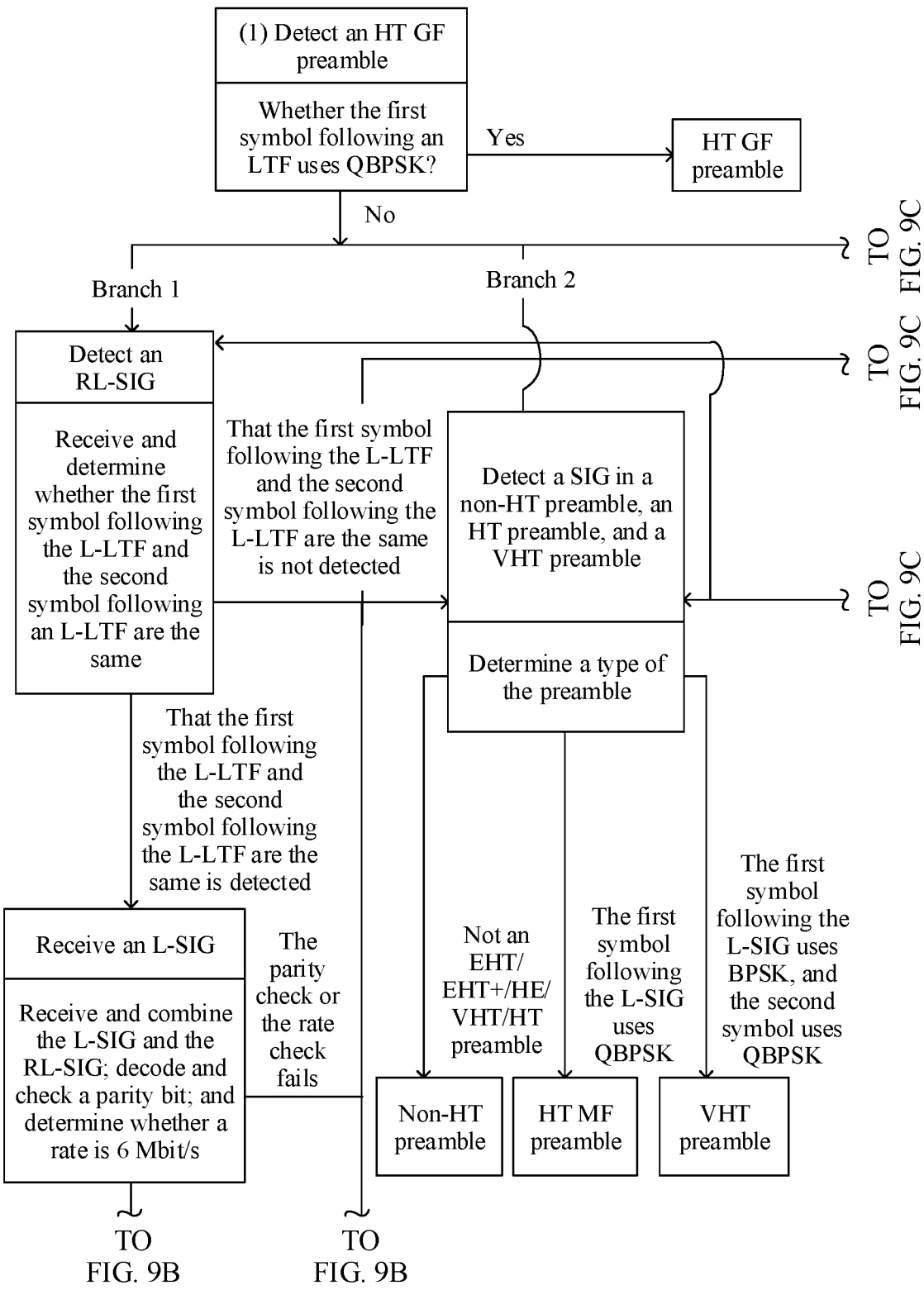
FIG. 9A to FIG. 9C are a flowchart of automatic detection of a receiver according to an embodiment of this application.
Figure 9B:
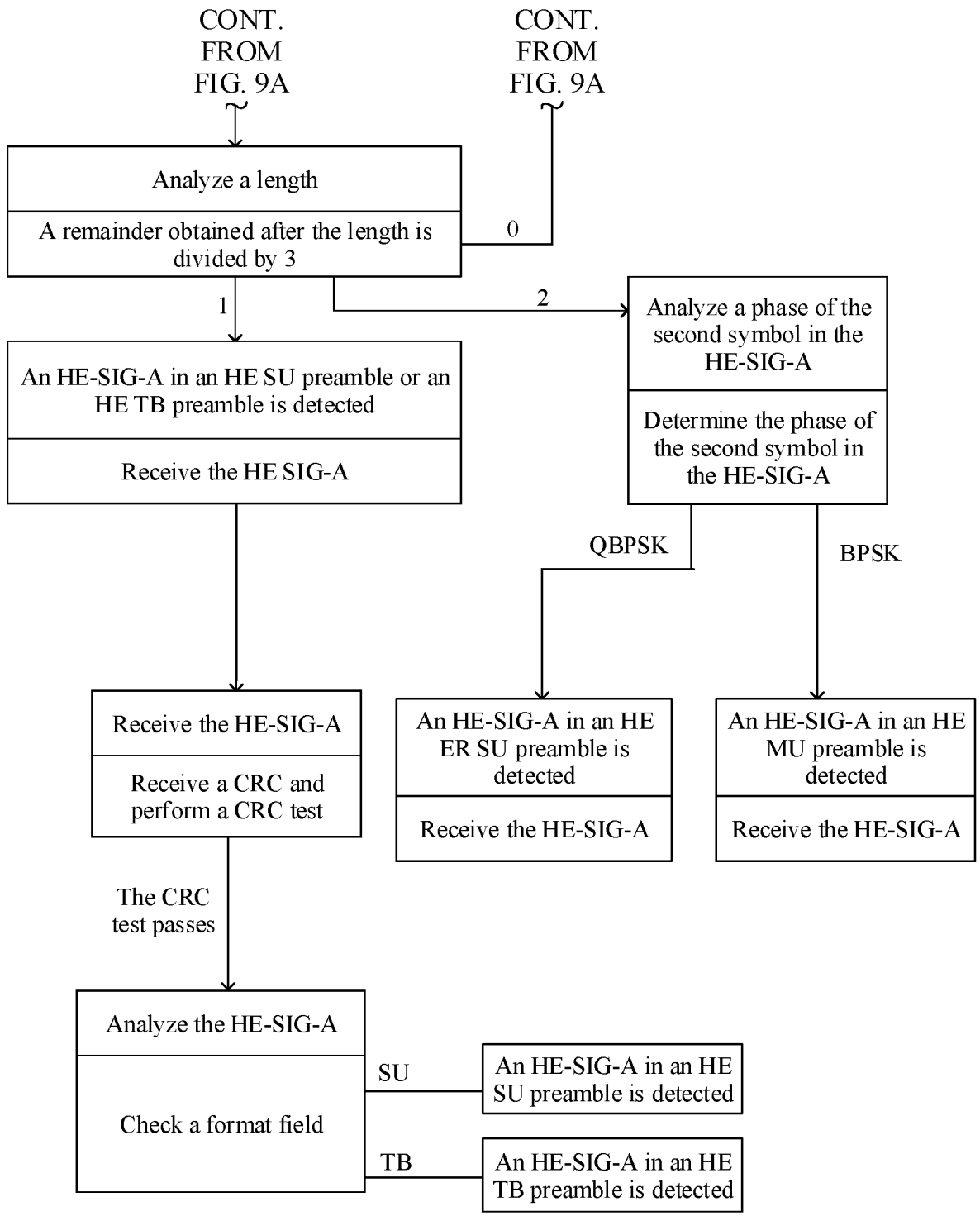
Figure 9C:
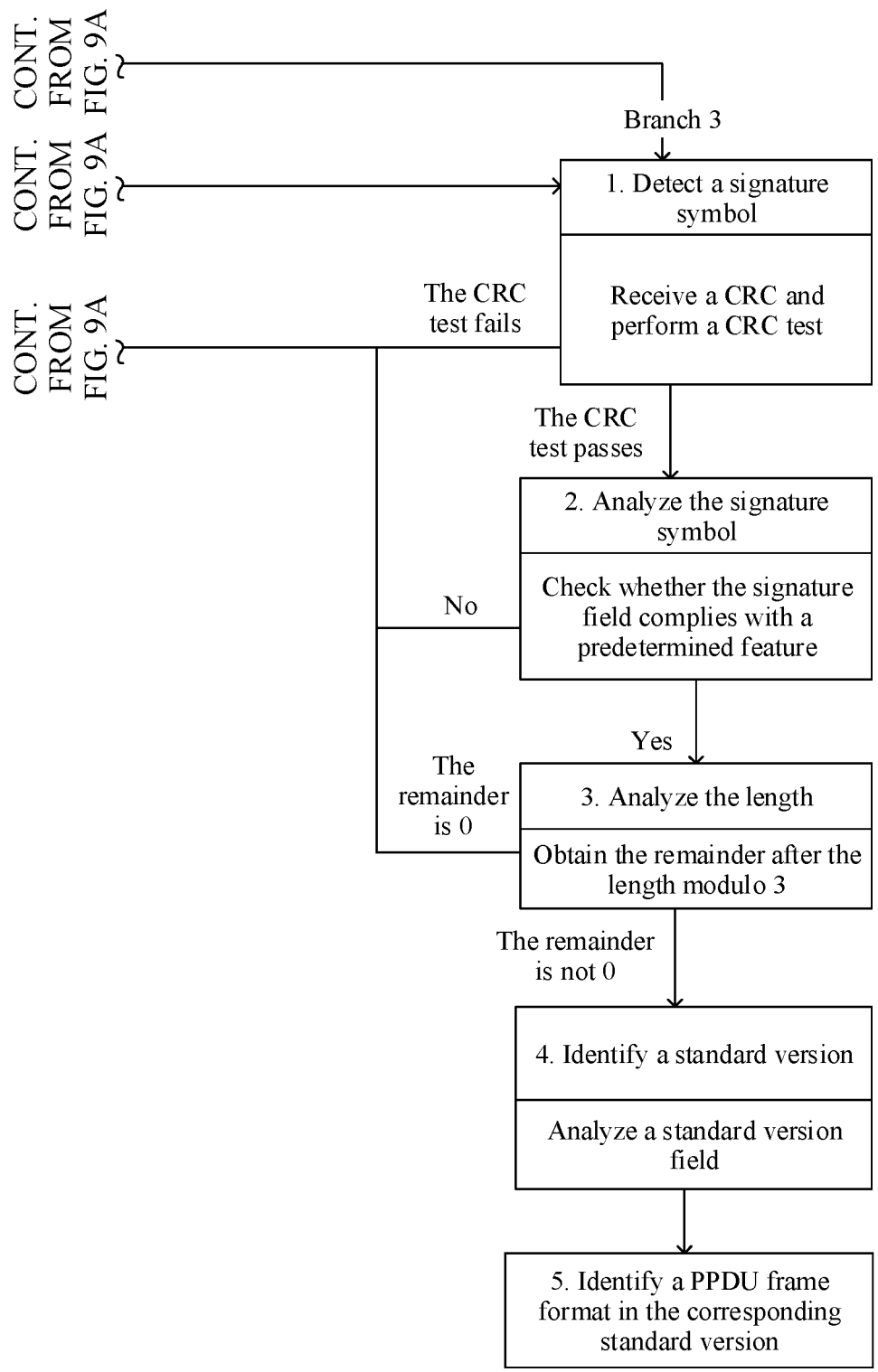

In FIG. 9A to FIG. 9C, for descriptions about the branch 1 and the branch 2, refer to related descriptions in FIG. 6A and FIG. 6B. A specific process of a branch 3 is mainly described herein. Steps in the branch 3 mainly include:

1. Detect the signature symbol. Step 1 specifically includes: receiving a CRC and performing a CRC test (that is, the CRC is used to check all or a part of the signature symbol); and if the test passes, performing step 2; otherwise, switching to the branch 1 or the branch 2.

2. Analyze the signature symbol. Step 2 specifically includes: checking whether the signature field meets a preset feature (that is, determining whether the signature symbol meets a preset condition); and if yes, performing step 3; or if no, switching to the branch 1 or the branch 2.

3. Analyze the remainder obtained after the value of the length field in the L-SIG modulo 3. If the remainder is not 0, step 4 is performed. If the remainder is 0, the branch 1 or the branch 2 is switched to.

4. Identify a standard version. Step 4 specifically includes: analyzing a standard version field (that is, the first preset bit), and identifying the standard version corresponding to the received PPDU based on the standard version field.

5. Identify a PPDU frame format in the corresponding standard version.

Step 5 is an optional step. There may be a plurality of PPDU frame formats in a standard version corresponding to the EHT PPDU or the EHT+ PPDU, and a purpose of step 5 is to identify a specific PPDU frame format in the standard version corresponding to the EHT PPDU or the EHT+ PPDU.

In addition, during processing at the receiver, when the branch 1 does not meet a corresponding determining condition, the branch 2 or the branch 3 may be switched to.

According to the method provided in the solution 1, the transmitter and the receiver may determine, by using the signature symbol in the PPDU, whether the received PPDU is the first PPDU, to identify the first PPDU, so that information in the received PPDU is correctly interpreted.

Solution 2

Figure 10:
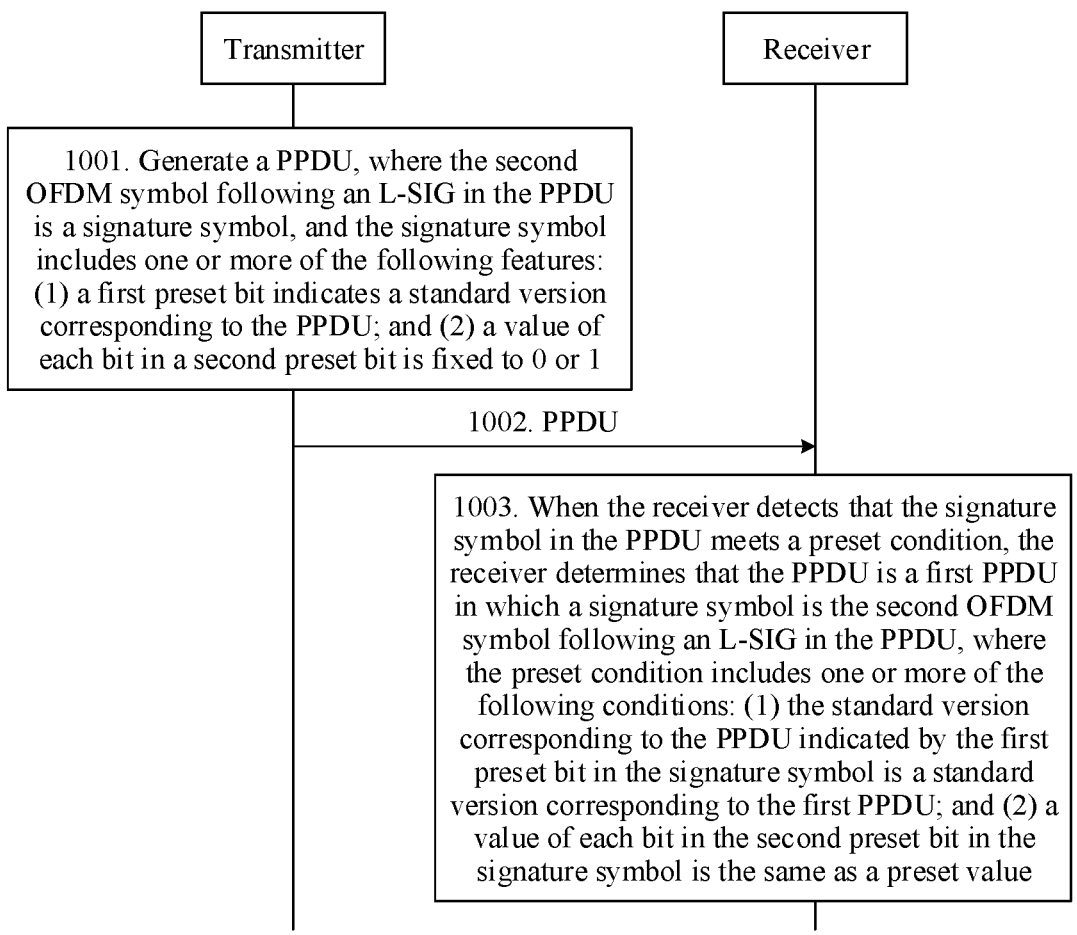
FIG. 10 is a schematic flowchart of a data sending and receiving method according to an embodiment of this application.

The solution 2 provides a data sending and receiving method. As shown in FIG. 10, the method includes the following steps.

1001. A transmitter generates a PPDU, where the second OFDM symbol following an L-SIG in the PPDU is a signature symbol, and the signature symbol includes one or more of the following features: (1) a first preset bit indicates a standard version corresponding to the PPDU; and (2) a value of each bit in a second preset bit is 0 or 1.

In the solution 2, the PPDU in which the second OFDM symbol following the L-SIG is a signature symbol is an EHT PPDU or an EHT+ PPDU.

The first preset bit and/or the second preset bit may include one or more bits. When the first preset bit and/or the second preset bit include/includes a plurality of bits, the plurality of bits may be consecutive bits, or may be inconsecutive bits. This is not limited. The first preset bit and/or the second preset bit may be preset, predefined, determined by a transceiver through negotiation, or specified in a protocol. The first preset bit and/or the second preset bit may be referred to as a signature field, and the signature field is used by a receiver to identify a frame format of a received PPDU. For example, the signature field may be used to indicate that a PPDU to which the signature field belongs is an EHT PPDU or an EHT+ PPDU. A bit sequence in the signature field may be referred to as a feature sequence (which may alternatively be referred to as a signature sequence).

In the signature symbol, a part other than the feature sequence may be an information bit part, or a part other than the feature sequence, a CRC, and a tail bit may be an information bit part. Information in the first preset bit may be considered as a part of a bit sequence, or may be considered as a part of information bits.

1002. The transmitter sends the PPDU to the receiver. Correspondingly, the receiver receives the PPDU from the transmitter.

1003. When the receiver detects that the signature symbol in the PPDU meets a preset condition, the receiver determines that the PPDU is a first PPDU. A signature symbol is the second OFDM symbol following an L-SIG in the PPDU. The preset condition includes one or more of the following conditions: (1) the standard version corresponding to the PPDU indicated by the first preset bit in the signature symbol is a standard version corresponding to the first PPDU; and (2) a value of each bit in the second preset bit in the signature symbol is the same as a preset value.

The first PPDU is an EHT PPDU or an EHT+ PPDU.

For related descriptions of the first preset bit, refer to related descriptions in the solution 1. Details are not described herein again.

At the transmitter, optionally, the second preset bit includes one or more of the following: (1) b0 and b1, (2) b2 and b3, (3) b9, and (4) b14, where b0=0, b1=1, b2=0, b3=1, b9=0, and b14=0, bi is a bit with an index of i in the signature symbol, and i is an integer greater than or equal to 0. At the receiver, the second preset bit includes one or more of the following: (1) b0 and b1, (2) b2 and b3, (3) b9, (4) b14, where a preset value of b0 is 0, a preset value of b1 is 1, a preset value of b2 is 0, a preset value of b3 is 1, a preset value of b9 is 0, and a preset value of b14 is 0. For example, it is assumed that the second preset bit includes b9 and b14, and if the receiver determines that values of b9 and b14 in the signature symbol in the received PPDU are 0 and 0 respectively, the receiver determines that a value of each bit in the second preset bit is the same as a preset value of the bit.

The second OFDM symbol following an L-SIG in an HE PPDU is the first OFDM symbol (which is denoted as an HE-SIG-A1) in an HE-SIG-A. The second OFDM symbol following an L-SIG in a VHT PPDU is the second OFDM symbol (which may be denoted as a VHT-SIG-A2) in a VHT-SIG-A. One or more bits in the signature symbol may be set to be different from those in the HE-SIG-A1 or the VHT-SIG-A2, to distinguish from the HE PPDU or the VHT PPDU. Specifically, b0 and b1 in the VHT-SIG-A2 are a short guard interval field and a short guard interval symbol quantity disambiguation field respectively. If b0 is set to 0, no guard interval is used, and b1 should also be set to 0. Therefore, if b0 is set to 0 and b1 is set to 1 in a signature symbol in an EHT PPDU or an EHT+ PPDU, the EHT PPDU or the EHT+ PPDU can be distinguished from the VHT PPDU. b2 and b3 in the VHT-SIG-A2 are a single-user/multi-user coding field and a low density parity code (low density parity code, LDPC) extra OFDM symbol field respectively. If b2 is set to 0, it indicates that BCC coding is used, and in this case, b3 is also set to 0. Therefore, if b2 is set to 0 and b3 is set to 1 in a signature symbol in an EHT PPDU or an EHT+ PPDU, the EHT PPDU or the EHT+ PPDU can be distinguished from the VHT PPDU. b9 in the VHT-SIG-A2 is a reserved bit and is set to 1. Therefore, if b9 in a signature symbol in an EHT PPDU or an EHT+ PPDU is set to 0, the EHT PPDU or the EHT+ PPDU can be distinguished from the VHT PPDU. b14 in the HE-SIG-A1 is a reserved bit and is set to 1. Therefore, if b14 in a signature symbol in an EHT PPDU or an EHT+ PPDU is set to 0, the EHT PPDU or the EHT+ PPDU can be distinguished from the HE PPDU.

It should be noted that a specific condition/specific conditions used by the receiver to determine whether the received PPDU is the first PPDU depends/depend on implementation of the transmitter. Generally, when the signature symbol of the transmitter has a feature/features, the receiver uses a condition/conditions corresponding to the feature/features to perform determining. For example, if the signature symbol of the transmitter includes the feature (1), the receiver performs determining by using the condition (1) corresponding to the feature (1). If the signature symbol of the transmitter includes the feature (2), the receiver performs determining by using the condition (2) corresponding to the feature (2). If the signature symbol of the transmitter includes the feature (1) and the feature (2), the receiver performs determining by using the condition (1) and the condition (2) corresponding to the feature (1) and the feature (2).

At the transmitter, optionally, the signature symbol further includes one or more of the following features: (3) a CRC in a third preset bit is configured to check a part of or all bits in the signature symbol; and (4) a tail bit is used to end BCC encoding, where the signature symbol uses the BCC encoding. In this case, before the receiver determines that the PPDU is the first PPDU, the method further includes: The receiver decodes the signature symbol based on the tail bit in the signature symbol, where a check on a part of or all bits in the signature symbol by using the CRC in the third preset bit in the signature symbol passes.

Because the HE-SIG-A1 in the HE PPDU does not have a CRC or a tail bit, the EHT PPDU or the EHT+ PPDU can be distinguished from the HE PPDU by carrying the CRC and/or the tail bit.

The third preset bit may include one or more bits. The third preset bit may be preset, predefined, determined by a transceiver through negotiation, or specified in a protocol. For example, the third preset bit may be b14 to b17 in the signature symbol, and the CRC in b14 to b17 may be used to perform a check on b0 to b13. It should be noted that, in different PPDU frame formats, a quantity of bits and/or locations of the bits occupied by a CRC are generally different. Therefore, if the check passes, it indicates that the signature symbol is a signature symbol in an EHT PPDU or an EHT+ PPDU. Therefore, it may be further determined that the received PPDU is an EHT PPDU or an EHT+ PPDU.

Optionally, a quantity of bits and/or locations of the bits occupied by the CRC in the signature symbol are different from a quantity of bits and/or locations of the bits occupied by a CRC in the second OFDM symbol in the VHT-SIG-A in the VHT PPDU.

Based on the foregoing descriptions, the following summarizes features of the signature symbol.

First, fields in the VHT-SIG-A2 in the VHT PPDU sequentially include: a short guard interval field, a short guard interval symbol quantity disambiguation (Short GI NSYM Disambiguation) field, a single-user/multi-user [0] coding (SU/MU coding) field, an LDPC extra OFDM symbol (LDPC Extra OFDM Symbol) field, a single-user coding and modulation scheme/multi-user [1 to 3] coding scheme (SU VHT-MCS/MU[1-3] Coding) field, a beamforming field, a reserved field, a CRC field, and a tail bit (Tail) field. Fields in the HE-SIG-A1 in the HE PPDU sequentially include: a format field, a beam change field, an uplink/downlink field, a coding and modulation scheme field, a dual-carrier modulation field, a basic service set field, a reserved (Reserved) field, a spatial multiplexing field, a bandwidth field, a guard interval and a long training sequence size field, and a quantity of space-time streams and intermediate preamble period field. For bits occupied by these fields, refer to Table 4.

TABLE 4

| | VHT-SIG-A2 in a VHT PPDU | | HE-SIG-A1 in an HE PPDU | |
|---|---|---|---|---|
| Bit | Field | Quantity of bits | Field | Quantity of bits |
| 0 | Short guard interval | 1 | Format | 1 |
| 1 | Short guard interval symbol quantity disambiguation | 1 | Beam change | 1 |
| 2 | Single-user/Multi-user [0] coding | 1 | Uplink/Downlink | 1 |
| 3 | LDPC extra OFDM symbol | 1 | Coding and modulation scheme | 4 |
| 4 | Single-user coding and modulation scheme/Multi-user [1 to 3] coding scheme | 4 | | |
| 5 | | | | |
| 6 | | | | |
| 7 | | | Dual carrier modulation | 1 |
| 8 | Beamforming | 1 | Basic service set | 6 |
| 9 | Reserved | 1 | | |
| 10 | CRC | 8 | | |
| 11 | | | | |
| 12 | | | | |
| 13 | | | | |
| 14 | | | Reserved | 1 |
| 15 | | | Spatial multiplexing | 4 |
| 16 | | | | |
| 17 | | | | |
| 18 | Tail bit (Tail) | 6 | | |
| 19 | | | Bandwidth | 2 |
| 20 | | | | |
| 21 | | | Guard interval and long training sequence size | 2 |
| 22 | | | | |

TABLE 4-continued

| VHT-SIG-A2 in a VHT PPDU | | HE-SIG-A1 in an HE PPDU | |
| --- | --- | --- | --- |
| Bit Field | Quantity of bits | Field | Quantity of bits |
| 23 | | Quantity of space-time streams and intermediate preamble period | 3 |
| 24 | | | |
| 25 | | | |

Note:
The L-SIG and the RL-SIG may provide channel estimation on four extra subcarriers. Therefore, compared with the VHT-SIG-A1/VHT-SIG-A2 and the L-SIG, the HE-SIG-A1 and the signature symbol in this embodiment carry two more bits of the information bits.

To distinguish the EHT PPDU or the EHT+ PPDU from the HE PPDU and the VHT PPDU, the signature symbol in the solution 2 may have one or more of features shown in Table 5. It should be noted that Table 5 is merely an example. During actual implementation, bits corresponding to a feature may be different from those in Table 5. For example, the CRC may not be located in b16 to b19, and may be in another location. A specific meaning of a feature may also be different from that in Table 5, and is based on a specific scenario.

TABLE 5

Signature symbol

| Bit | Field | Quantity of bits | Feature |
| --- | --- | --- | --- |
| 0 | Part of a feature sequence | 1 | b0 is set to 0, and b1 is set to 1. (In a VHT-SIG-A2, if a short guard interval field (namely, b0) is set to 0, a guard interval is not used. Therefore, a short guard interval symbol quantity (namely, b1) should be set to 0. b1 in the signature symbol is set to 1 to be distinguished from the VHT PPDU.) |
| 1 | Part of the feature sequence | 1 | |
| 2 | Part of the feature sequence | 1 | Set b2 to 0 and b3 to 1. (In a VHT-SIG-A2, if BCC encoding is used (in this case, b2 is 0), an LDPC extra OFDM symbol (namely, b3) should be set to 0. b3 in the signature symbol is set to 1 to be distinguished from the VHT PPDU.) |
| 3 | Part of the feature sequence | 1 | |
| 4 | Information bits/Part of the feature sequence | 5 | |
| 5 | | | |
| 6 | | | |
| 7 | | | |
| 8 | | | |
| 9 | Part of the feature sequence | 1 | b9 is fixed to 0. (A reserved bit in a VHT-SIG-A2 is fixed to 1.) |
| 10 | Information bits/Part of the feature sequence | 6 | b14 is set to 0. (A reserved bit in an HE-SIG-A1 is set to 1.) |
| 11 | | | |
| 12 | | | |
| 13 | | | |
| 14 | | | |
| 15 | | | |
| 16 | CRC | 4 | The CRC is used to verify information in the signature symbol. A quantity of bits and positions of the bits are to be determined. |
| 17 | | | |
| 18 | | | |
| 19 | | | |
| 20 | Tail bit | 6 | The tail bit is used to end BCC encoding. |
| 21 | | | |
| 22 | | | |
| 23 | | | |
| 24 | | | |
| 25 | | | |

It should be noted that all features in the signature symbol in Table 5 refer to features in the signature symbol before encoding.

Optionally, the first OFDM symbol following the L-SIG in the PPDU is an L-SIG obtained after masking (masked, where the mask herein is a sequence of multiplying +1 and/or −1 and a value that is on each subcarrier in frequency domain and that is of the first OFDM symbol following the L-SIG) is performed on the L-SIG (namely, a masked RL-SIG). In this case, for some fields in a preamble part in the EHT PPDU or the EHT+ PPDU, refer to FIG. 11. In this case, the preset condition further includes: information obtained after the first OFDM symbol following the L-SIG in the PPDU is demasked is the same as the L-SIG.

In FIG. 11, the L-SIG may alternatively be BPSK modulation, to coexist with a legacy device.

In addition, the receiver may further determine, by using another feature of the signature symbol or a feature of an OFDM symbol other than the signature symbol, whether the received PPDU is the first PPDU. Specifically, the following case 1 and case 2 are separately described.

Case 1: Whether the received PPDU is the first PPDU is further determined by using a modulation scheme of the signature symbol.

In the case 1, in a possible implementation, the modulation scheme of the signature symbol is BPSK modulation, and the preset condition further includes: determining that the modulation scheme of the signature symbol is BPSK modulation. In this case, for the transmitter and the receiver, the modulation scheme of the signature symbol in the first PPDU may be preconfigured, predefined, or determined through negotiation in advance to be BPSK modulation. In this case, if the receiver determines that the modulation scheme of the signature symbol in the received PPDU is BPSK modulation, the receiver may further determine that the received PPDU is the first PPDU.

In the case 1, in another possible implementation, the modulation scheme of the signature symbol is QBPSK modulation, and the preset condition further includes: determining that the modulation scheme of the signature symbol is QBPSK modulation. In this case, for the transmitter and the receiver, the modulation scheme of the signature symbol in the first PPDU may be preconfigured, predefined, or determined through negotiation in advance to be QBPSK modulation. In this case, if the receiver determines that the modulation scheme of the signature symbol in the received PPDU is QBPSK modulation, the receiver may further determine that the received PPDU is the first PPDU.

Case 2: Whether the received PPDU is the first PPDU is further determined by using a value of a length field in the L-SIG in the PPDU.

In the case 2, in a possible implementation, a remainder obtained after the value of the length field in the L-SIG in the PPDU modulo 3 is 1 or 2, and the preset condition further includes: determining that the remainder obtained after the value of the length field in the L-SIG in the PPDU modulo 3 is 1 or 2. In this case, for the transmitter and the receiver, that a remainder obtained after a value of a length field in an L-SIG in the first PPDU modulo 3 is 1 or 2 may be preconfigured, predefined, or determined through negotiation in advance. In this case, if the receiver determines that the remainder obtained after the value of the length field in the L-SIG in the PPDU modulo 3 is 1 or 2, the receiver may further determine that the received PPDU is the first PPDU.

In the case 2, in another possible implementation, a remainder obtained after the value of the length field in the L-SIG in the PPDU modulo 3 is 0, and the preset condition further includes: determining that the remainder obtained after the value of the length field in the L-SIG in the PPDU modulo 3 is 0. In this case, for the transmitter and the receiver, that a remainder obtained after a value of a length field in an L-SIG in the first PPDU modulo 3 is 0 may be preconfigured, predefined, or determined through negotiation in advance. In this case, if the receiver determines that the remainder obtained after the value of the length field in the L-SIG in the PPDU modulo 3 is 0, the receiver may further determine that the received PPDU is the first PPDU.

It should be noted that, in the foregoing method, when the PPDU received by the receiver meets more preset conditions, the first PPDU is more likely to be the received PPDU, and determining accuracy of the receiver is higher.

To learn more clearly about actions of the receiver, the following uses an example to describe a processing procedure of the receiver. In this example, a remainder obtained after a value of a length field in an L-SIG in the first PPDU modulo 3 is not 0, and the first preset bit is located in the information bits rather than in the signature field. Specifically, refer to FIG. 12A to FIG. 12C.

Figure 12A:
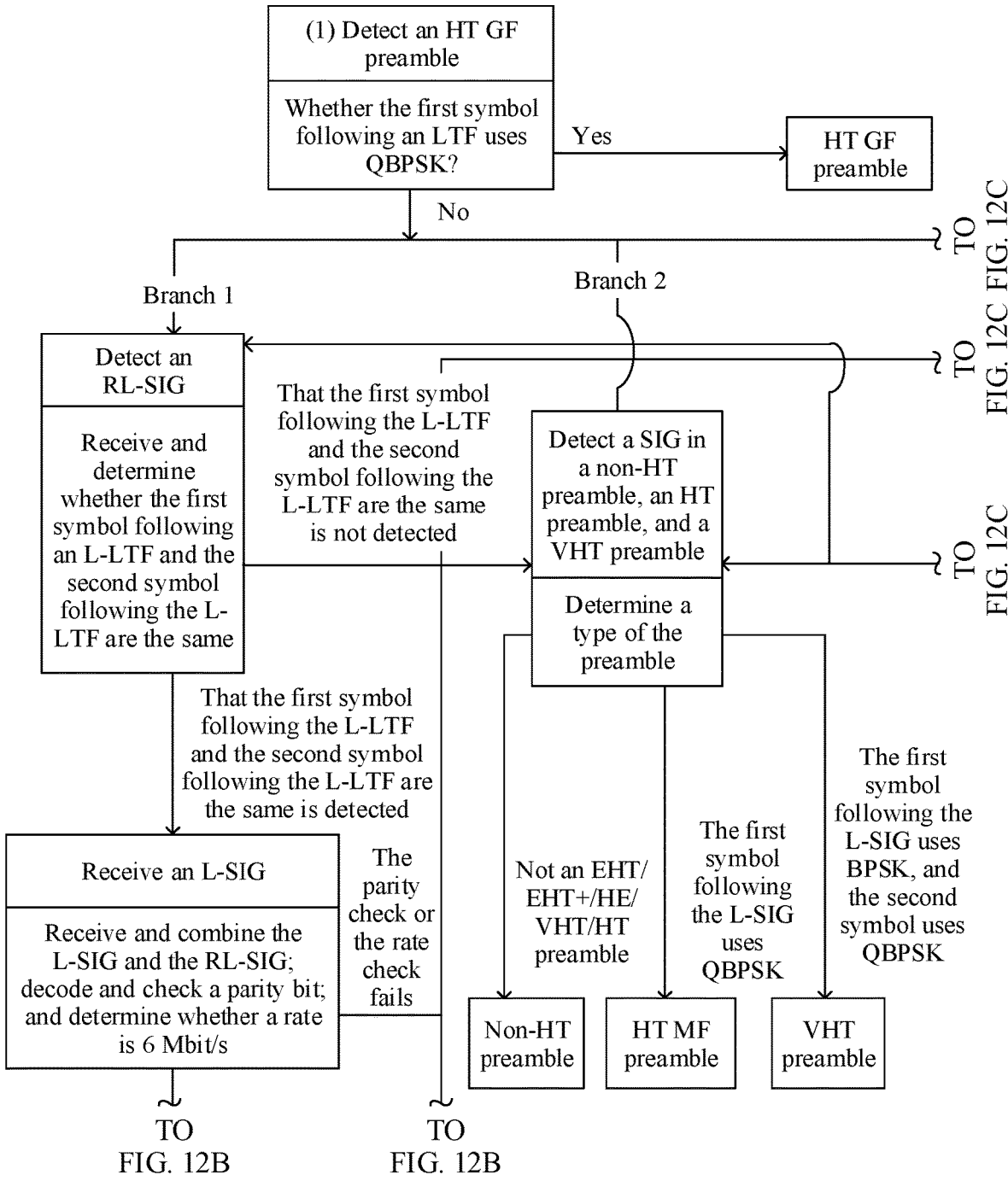
FIG. 12A to FIG. 12C are a flowchart of automatic detection of a receiver according to an embodiment of this application.
Figure 12B:
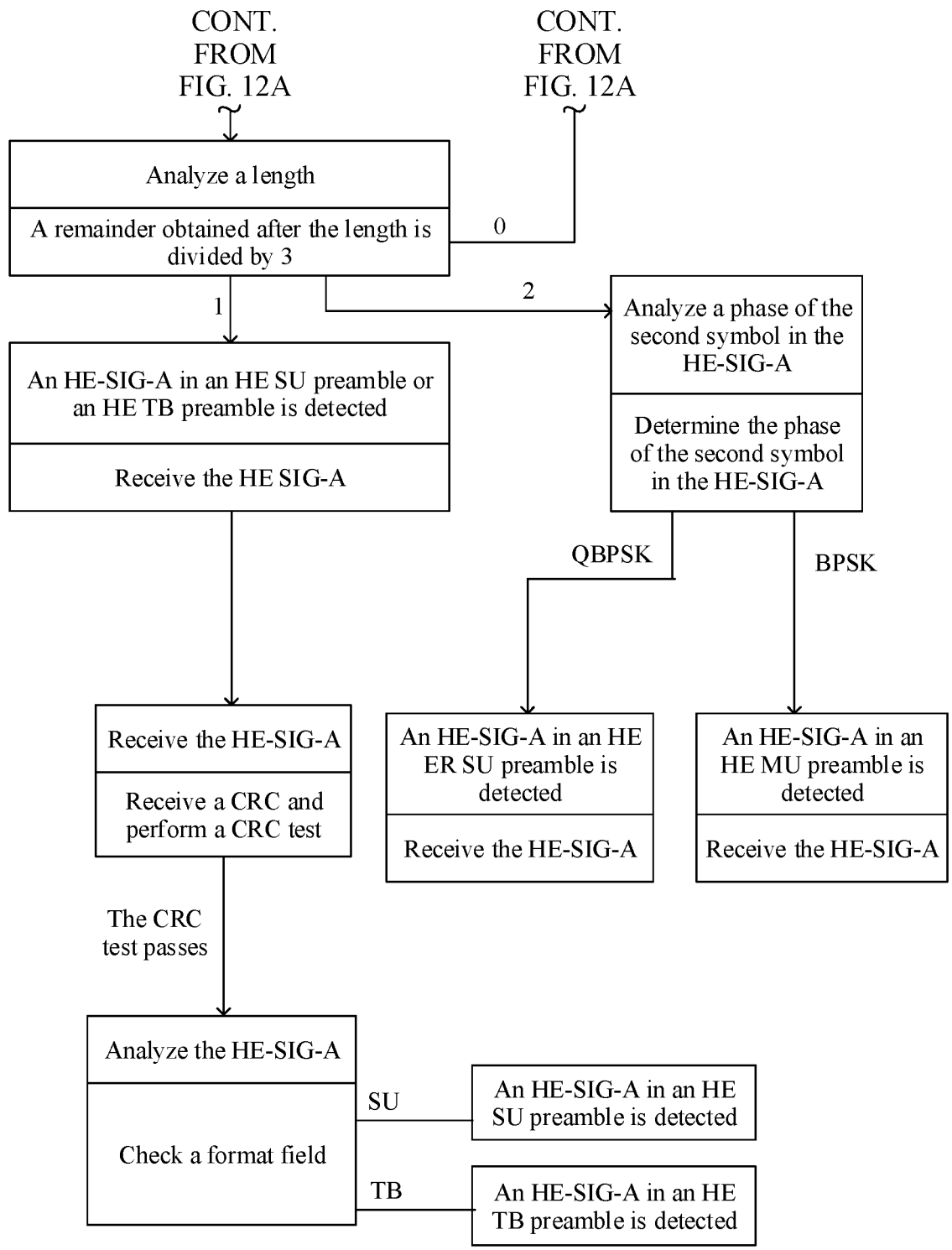
Figure 12C:
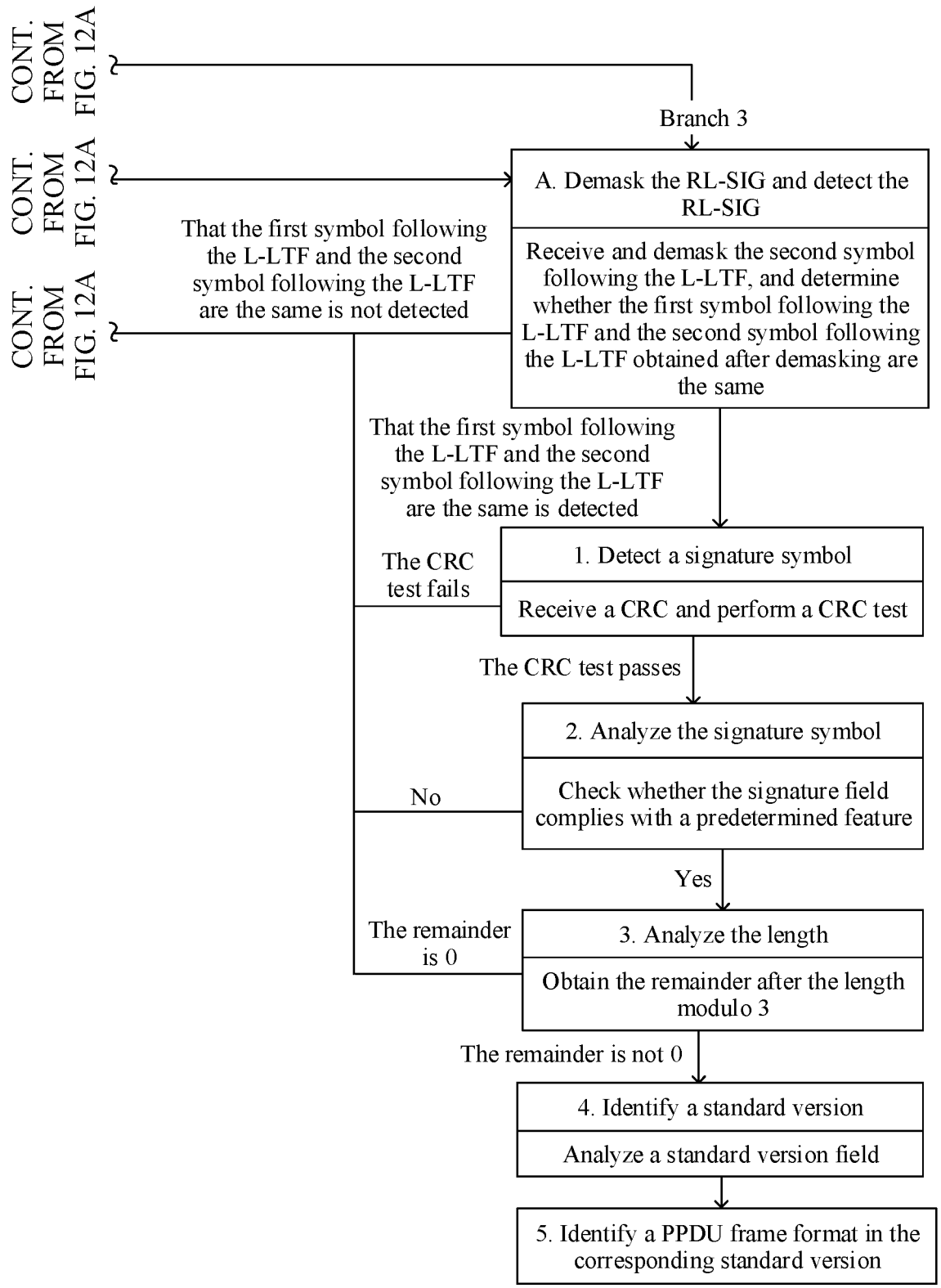

In FIG. 12A to FIG. 12C, for descriptions about the branch 1 and the branch 2, refer to related descriptions in FIG. 6A and FIG. 6B. Compared with the branch 3 in FIG. 9A to FIG. 9C, a branch 3 in FIG. 12A to FIG. 12C has an extra step A. Step A: Demask an RL-SIG and detect the RL-SIG. Step A specifically includes: receiving and demasking the second OFDM symbol following an L-LTF; determining whether the first OFDM symbol following the L-LTF is the same as the second OFDM symbol after demasking is performed; and if that the first OFDM symbol following the L-LTF is the same as the second OFDM symbol after demasking is performed is detected, performing step 1 to step 5. For related descriptions of step 1 to step 5, refer to related descriptions in FIG. 9A to FIG. 9C in the solution 1. Details are not described herein again. If that the first OFDM symbol following the L-LTF is the same as the second OFDM symbol after demasking is performed is not detected, the branch 1 or the branch 2 is switched to.

Similar to FIG. 9A to FIG. 9C, during processing at the receiver, when the branch 1 does not meet a corresponding determining condition, the branch 2 or the branch 3 may be switched to.

According to the method provided in the solution 2, the transmitter and the receiver may determine, by using the signature symbol in the PPDU, whether the received PPDU is the first PPDU, to identify the first PPDU, so that information in the received PPDU is correctly interpreted.

Solution 3

Figure 13:
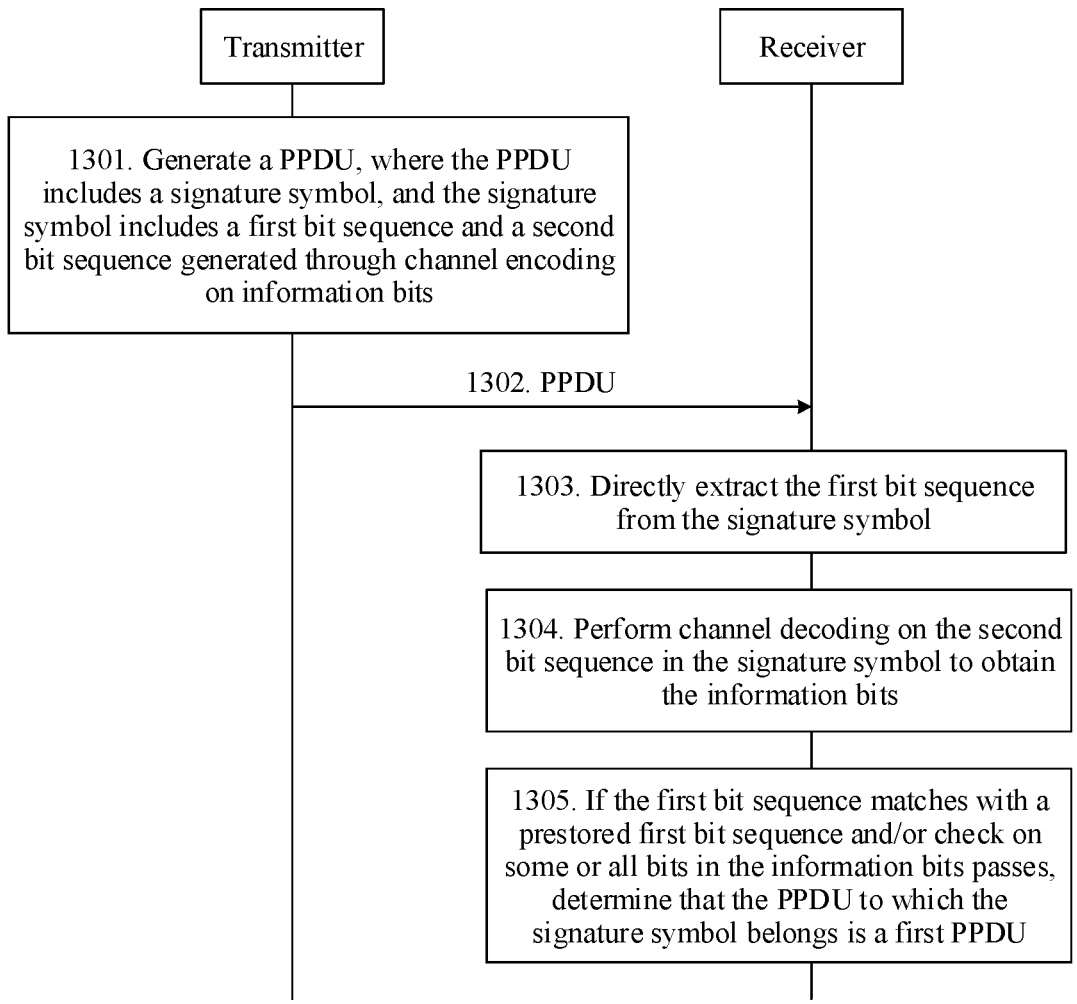
FIG. 13 is a schematic flowchart of a data sending and receiving method according to an embodiment of this application.

The solution 3 provides a data sending and receiving method. As shown in FIG. 13, the method includes the following steps.

1301. A transmitter generates a PPDU, where the PPDU includes a signature symbol, and the signature symbol includes a first bit sequence and a second bit sequence generated through channel coding on information bits.

Optionally, the first bit sequence is a Gray sequence.

Optionally, the first bit sequence is a bit sequence on which channel coding is not performed.

The information bits may include information such as a quantity of OFDM symbols in an EHT-SIG-A or an XX-SIG-A, a modulation and coding scheme (modulation and coding scheme, MCS) of the EHT-SIG-A or the XX-SIG-A, a basic service set (basic service set, BSS) color (BSS Color) used to specify a cell, and a bandwidth. XX-SIG-A indicates an SIG-A field in an EHT+ PPDU.

1302. The transmitter sends the PPDU to a receiver. Correspondingly, the receiver receives the PPDU from the transmitter.

Optionally, before step 1302, the method further includes: The receiver performs interleaving processing on the first bit sequence and the second bit sequence obtained after channel coding. This ensures that the first bit sequence and the second bit sequence are free from impact of deep fading (deep fading).

1303. The receiver directly extracts the first bit sequence from the signature symbol.

The directly extracting means that the first bit sequence can be obtained without decoding.

1304. The receiver performs channel decoding on the second bit sequence in the signature symbol to obtain the information bits.

1305. If the first bit sequence matches with a prestored first bit sequence and/or a check on a part of or all bits in the information bits passes, the receiver determines that the PPDU to which the signature symbol belongs is a first PPDU.

The first PPDU is an EHT PPDU or an EHT+ PPDU.

If it is considered that the information bits include a CRC and a tail bit, the receiver may check bits in the information bits other than the CRC and the tail bit by using the CRC and the tail bit in the information bits. If it is considered that the information bits do not include a CRC and a tail bit, the receiver may check the information bits by using a CRC and a tail bit.

According to the method provided in the solution 3, because channel coding is not performed on the first bit sequence sent by the transmitter, the receiver may directly extract the first bit sequence without performing channel decoding, to quickly determine whether the received PPDU is the first PPDU. This improves processing efficiency of the receiver. In addition, the receiver may further check a part of or all bits in the information bits. If the check passes, the receiver may further determine that the received PPDU is the first PPDU. This improves determining accuracy.

It should be noted that the foregoing method describes only some procedures of the transmitter and the receiver. During actual implementation, the transmitter may further perform operations such as constellation mapping, inverse discrete Fourier transform (IDFT), adding a cyclic shift delay (CSD), adding a guard interval (GI), windowing, and analog and radio frequency operations on the interleaved sequence. Correspondingly, the receiver further needs to perform operations such as analog and radio frequency operations, removing a GI, discrete Fourier transform (DFT), and de-interleaving on the received PPDU.

The following uses an example to describe the foregoing sending and receiving process.

Figure 14:
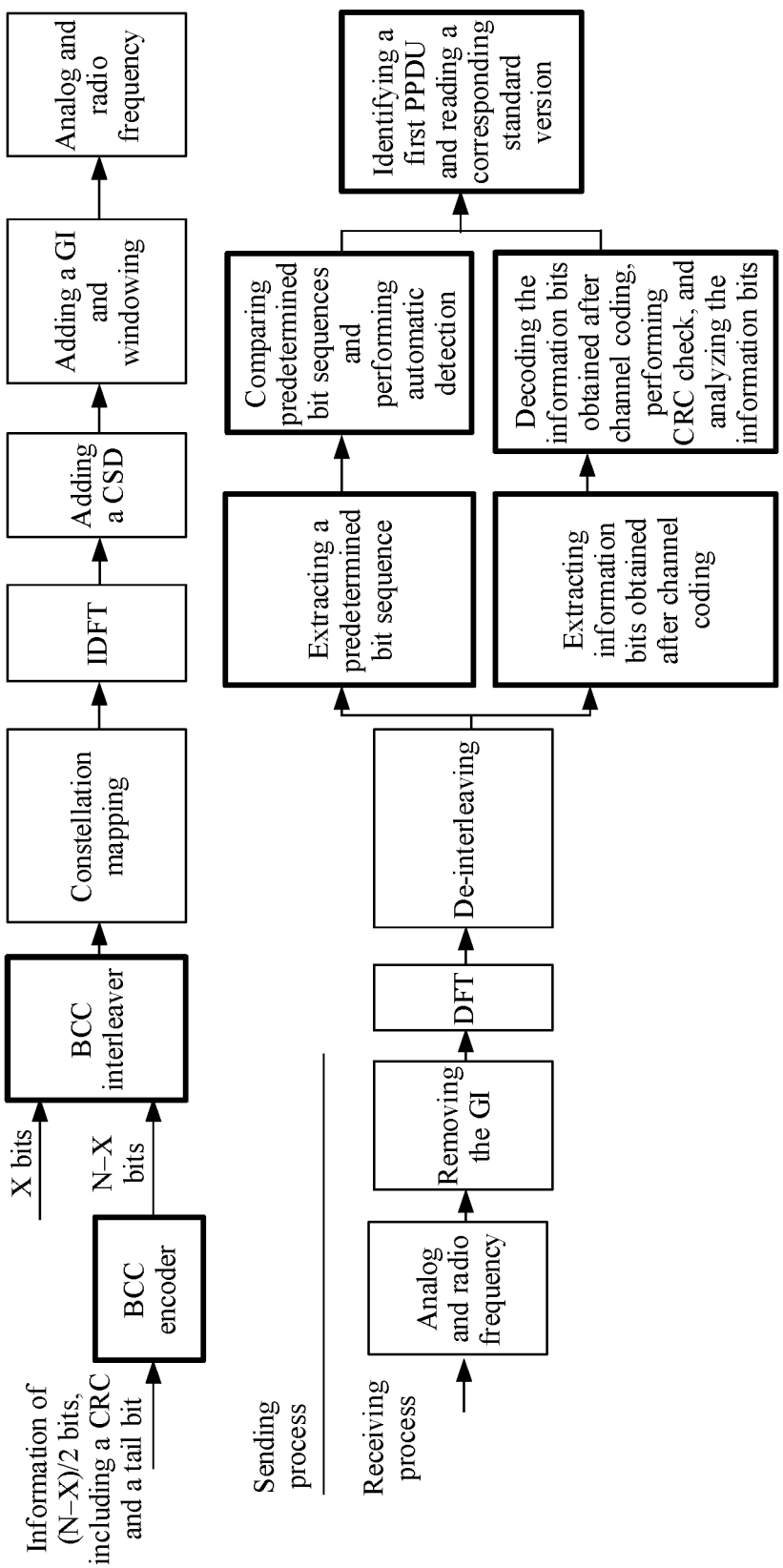
FIG. 14 is a schematic flowchart of generating a signature symbol according to an embodiment of this application.

For example, refer to FIG. 14. A signature symbol includes two parts. The first part is a predetermined bit sequence (that is, the first bit sequence) that is known to both the transmitter and the receiver and that is directly carried on a frequency domain subcarrier, and occupies a total of X bits, where X is a positive integer greater than 0 and less than a quantity of data subcarriers of the signature symbol (for example, the quantity is 48 or 52, and is denoted as N herein), for example, X may be 8 or 16. The second part is N-X bits (that is, the second bit sequence), and is used to carry information about the signature symbol. The N-X bits may be generated through BPSK encoding (N-X)/2 information bits (including a CRC and a tail bit) at a bit rate of 1/2. The predetermined bit sequence on which channel coding is not performed and the information bits obtained after channel coding may be understood as frequency division multiplexing. For example, if there is a data subcarrier of 48 bits in total, a 16-bit predetermined bit sequence is mapped to data subcarriers 0 to 15 in frequency domain. 16-bit information bits are encoded to obtain 32 bits, and are mapped to data subcarriers 16 to 47 in frequency domain. Then, an interleaver operation is performed on the 48 bits uniformly. After receiving and de-interleaving the PPDU, the receiver extracts the predetermined bit sequence and the information bits obtained after channel coding based on locations at which the bits in the signature symbol are mapped to on the data subcarriers, and performs matching between the known predetermined bit sequence and the received predetermined bit sequence. When the matching succeeds, that the received PPDU is the first PPDU is determined. Further, after the known predetermined bit sequence successfully matches with the received predetermined bit sequence, the receiver only determines that the received PPDU may be the first PPDU. The receiver may continue to decode the information bits obtained after channel coding to obtain information bits. The CRC and the tail bit are used to check a part of or all bits in the information bits, and only if the check passes, that the received PPDU is the first PPDU is determined.

In addition, the solution 3 may further be combined with the solution 1 and the solution 2, which is specifically described by using a manner 1 and a manner 2.

Manner 1: Combination with the Solution 1

In the manner 1, the first bit sequence is located in the first OFDM symbol following the L-SIG in the PPDU, and the first bit sequence includes one or more of the following features: (1) a first preset bit indicates a standard version corresponding to the PPDU; and (2) a value of each bit in a second preset bit is 0 or 1.

In this case, before the receiver determines that the PPDU to which the signature symbol belongs is the first PPDU, the method further includes: The receiver determines that the first bit sequence meets a preset condition, where the preset condition includes one or more of the following conditions: (1) a standard version corresponding to the PPDU indicated by a first preset bit in the first bit sequence is a standard version corresponding to the first PPDU; and (2) a value of each bit in a second preset bit in the first bit sequence is the same as a preset value.

At the transmitter, for example, the second preset bit includes one or more of b2, b3, b4, and b10, where b2=0, b3=0, b4=1, and b10=1. At the receiver, the second preset bit includes one or more of b2, b3, b4, and b10, where a preset value of b2 is 0, a preset value of b3 is 0, a preset value of b4 is 1, and a preset value of b10 is 1.

In the manner 1, the receiver may more accurately identify the first PPDU. An identification principle is the same as that in the solution 1, and details are not described herein again.

Manner 2: Combination with the Solution 2

The first bit sequence is located in the second OFDM symbol following the L-SIG in the PPDU, and the first bit sequence includes one or more of the following features: (1) a first preset bit indicates a standard version corresponding to the PPDU; and (2) a value of each bit in a second preset bit is 0 or 1.

In this case, before the receiver determines that the PPDU to which the signature symbol belongs is the first PPDU, the method further includes: The receiver determines that the first bit sequence meets a preset condition, where the preset condition includes one or more of the following conditions: (1) a standard version corresponding to the PPDU indicated by a first preset bit in the first bit sequence is a standard version corresponding to the first PPDU; and (2) a value of each bit in a second preset bit in the first bit sequence is the same as a preset value.

At the transmitter, for example, the second preset bit includes one or more of the following: (1) b0 and b1, (2) b2 and b3, (3) b9, and (4) b14, where b0=0, b1=1, b2=0, b3=1, b9=0, and b14=0. Correspondingly, at the receiver, the second preset bit includes one or more of the following: (1) b0 and b1, (2) b2 and b3, (3) b9, (4) b14, where a preset value of b0 is 0, a preset value of b1 is 1, a preset value of b2 is 0, a preset value of b3 is 1, a preset value of b9 is 0, and a preset value of b14 is 0.

In the manner 2, the receiver may more accurately identify the first PPDU. An identification principle is the same as that in the solution 1, and details are not described herein again.

The foregoing mainly describes the solutions in the embodiments of this application from a perspective of interaction between the network elements. It may be understood that to implement the foregoing functions, each network element such as a transmitter apparatus and a receiver apparatus, includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the transmitter apparatus and the receiver apparatus may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that, in this embodiment of this application, division into units is an example, and is merely logical function division. During actual implementation, another division manner may be used.

Figure 15:
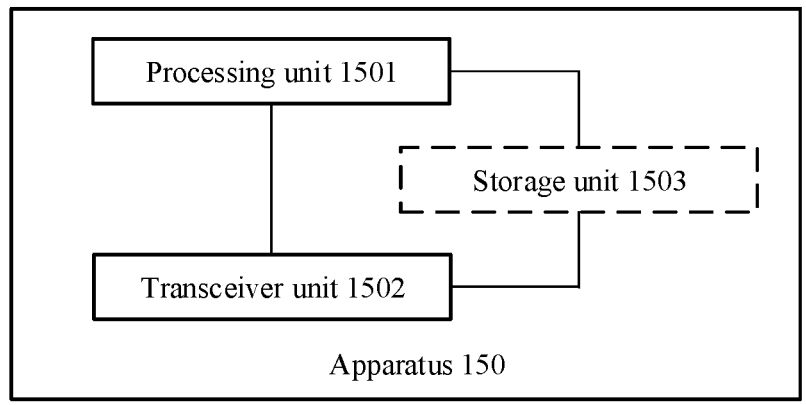
FIG. 15 is a schematic composition diagram of an apparatus according to an embodiment of this application.

FIG. 15 is a schematic diagram of a structure of an apparatus 150. The schematic diagram of the structure includes a processing unit 1501 and a transceiver unit 1502. An antenna and a control circuit that have sending and receiving functions in the apparatus 150 may be considered as the transceiver unit 1502 in the apparatus 150, and a processor that has a processing function may be considered as a processing unit 1501 in a transmitter apparatus. The transceiver unit 1502 may be a transceiver, a transceiver machine, a transceiver circuit, or the like. Optionally, the apparatus 150 further includes a storage unit 1503.

When the apparatus 150 is the foregoing transmitter apparatus, the processing unit 1501 and the transceiver unit 1502 may be configured to perform actions performed by the transmitter apparatus in the foregoing method. For example, the processing unit 1501 is configured to perform step 701 in FIG. 7, and the transceiver unit 1502 is configured to perform step 702 in FIG. 7. In another example, the processing unit 1501 is configured to perform step 1001 in FIG. 10, and the transceiver unit 1502 is configured to perform step 1002 in FIG. 10. In another example, the processing unit 1501 is configured to perform step 1301 in FIG. 13, and the transceiver unit 1502 is configured to perform step 1302 in FIG. 13.

The storage unit 1503 is configured to store computer instructions, so that the processing unit 1501 invokes the computer instructions to perform step 701 in FIG. 7, and controls the transceiver unit 1502 to perform step 702 in FIG. 7; or so that the processing unit 1501 invokes the computer instructions to perform step 1001 in FIG. 10, and controls the transceiver unit 1502 to perform step 1002 in FIG. 10; or so that the processing unit 1501 invokes the computer instruction to perform step 1301 in FIG. 13, and controls the transceiver unit 1502 to perform step 1302 in FIG. 13.

The transmitter apparatus may be a device, or may be a chip in a device.

When the apparatus 150 is the foregoing receiver apparatus, the processing unit 1501 and the transceiver unit 1502 may be configured to perform actions performed by the receiver apparatus in the foregoing method. For example, the transceiver unit 1502 is configured to perform step 702 in FIG. 7, and the processing unit 1501 is configured to perform step 703 in FIG. 7. In another example, the transceiver unit 1502 is configured to perform step 1002 in FIG. 10, and the processing unit 1501 is configured to perform step 1003 in FIG. 10. In another example, the transceiver unit 1502 is configured to perform step 1302 in FIG. 13, and the processing unit 1501 is configured to perform step 1302 to step 1305 in FIG. 13.

The storage unit 1503 is configured to store computer instructions, so that the processing unit 1501 invokes the computer instructions to control the transceiver unit 1502 to perform step 702 in FIG. 7, and perform step 703 in FIG. 7; or so that the processing unit 1501 invokes the computer instructions to control the transceiver unit 1502 to perform step 1002 in FIG. 10, and perform step 1003 in FIG. 10; or so that the processing unit 1501 invokes the computer instructions to control the transceiver unit 1502 to perform step 1302 in FIG. 13, and perform step 1302 to step 1305 in FIG. 13.

The receiver apparatus may be a device, or may be a chip in a device.

When an integrated unit in FIG. 15 is implemented in a form of a software function module and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor (processor) to perform all or some of the steps of the methods in the embodiments of this application. The storage medium that stores the computer software product includes any medium that can store program code, for example, a USB flash drive, a removable hard disk, a read-only memory (ROM), a random access memory (RAM), a magnetic disk, or an optical disc.

The unit in FIG. 15 may alternatively be referred to as a module. For example, the processing unit may be referred to as a processing module.

Figure 16:
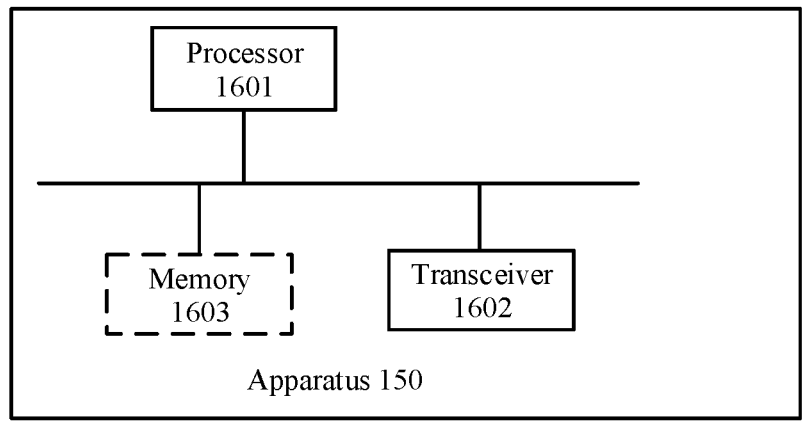
FIG. 16 and FIG. 17 each are a schematic diagram of a hardware structure of an apparatus according to an embodiment of this application.

FIG. 16 is a schematic diagram of another possible structure of the apparatus 150 in the foregoing embodiments. Refer to FIG. 16. The apparatus 150 includes a processor 1601 and a transceiver 1602. Optionally, the apparatus 150 further includes a memory 1603 connected to the processor 1601. The processor 1601, the transceiver 1602, and the memory 1603 are connected by using a bus.

When the apparatus of the structure in FIG. 16 is the foregoing transmitter apparatus, if the apparatus 150 shown in FIG. 15 is the transmitter apparatus, the processor 1601 has a same function as the processing unit 1501, and the transceiver 1602 has a same function as the foregoing transceiver unit 1502. Optionally, the memory 1603 has a same function as the storage unit 1503.

When the apparatus of the structure in FIG. 16 is the foregoing receiver apparatus, if the apparatus 150 shown in FIG. 15 is a receiver apparatus, the processor 1601 has a same function as the processing unit 1501, and the transceiver 1602 has a same function as the foregoing transceiver unit 1502. Optionally, the memory 1603 has a same function as the storage unit 1503.

The processor 1601 may be a general-purpose central processing unit (CPU), a microprocessor, an application-specific integrated circuit (ASIC), or one or more integrated circuits for controlling program execution of the solutions in this application. The processor 1601 may further include a plurality of CPUs, and the processor 1601 may be a single-core (single-CPU) processor or a multi-core (multi-CPU) processor. The processor herein may be one or more devices, circuits, and/or processing cores configured to process data (for example, a computer program instruction).

The memory 1603 may be a ROM or another type of static storage device that can store static information and instructions, a RAM or another type of dynamic storage device that can store information and instructions, or may be an electrically erasable programmable read-only memory (EE-PROM), a compact disc read-only memory (CD-ROM) or another compact disc storage, an optical disc storage (including a compressed optical disc, a laser disc, an optical disc, a digital versatile disc, a Blu-ray disc), a magnetic disk storage medium or another magnetic storage device, or any other medium that can be used to carry or store expected program code in a form of instructions or a data structure and that can be accessed by a computer. This is not limited in the embodiments of this application. The memory 1603 may exist independently, or may be integrated with the processor 1601. The memory 1603 may include computer program code.

Figure 17:
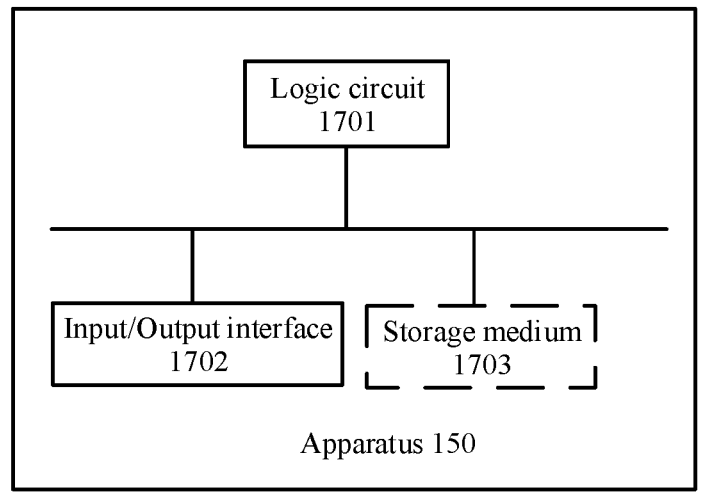

FIG. 17 is a schematic diagram of another possible structure of the apparatus 150 in the foregoing embodiments. Refer to FIG. 17. The apparatus 150 includes a logic circuit 1701 and an input/output interface 1702. Optionally, the apparatus 150 further includes a storage medium 1703.

When the apparatus of the structure in FIG. 17 is the foregoing transmitter apparatus, if the apparatus 150 shown in FIG. 15 is the transmitter apparatus, the logic circuit 1701 has a same function as the processing unit 1501, and the input/output interface 1702 has a same function as the foregoing transceiver unit 1502. Optionally, the storage medium 1703 has a same function as the storage unit 1503.

When the apparatus of the structure in FIG. 17 is the foregoing receiver apparatus, if the apparatus 150 shown in FIG. 15 is a receiver apparatus, the logic circuit 1701 has a same function as the processing unit 1501, and the input/output interface 1702 has a same function as the foregoing transceiver unit 1502. Optionally, the storage medium 1703 has a same function as the storage unit 1503.

An embodiment of this application further provides a computer-readable storage medium including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system including the foregoing transmitter and receiver.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (solid-state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A data sending method, comprising:
generating, by a transmitter, a physical layer protocol data unit (PPDU), wherein the PPDU comprises a signature field, and the signature field comprises one or more of: (1) a first preset bit that indicates a standard version corresponding to the PPDU; (2) a cyclic redundancy code (CRC) in a third preset bit that is used to check a part of or all bits in the signature field; or (3) a tail bit that is used to end binary convolutional code (BCC) encoding; and
sending, by the transmitter, the PPDU to a receiver,
wherein at least one of a quantity of bits and locations of the bits occupied by the CRC in the signature field are different from at least one of a quantity of bits and locations of the bits occupied by a parity bit in a repeated legacy signaling field (RL-SIG) in a high efficiency physical layer protocol data unit (HE PPDU).

2. The method according to claim 1, wherein the PPDU further comprises a legacy signaling field (L-SIG) and the RL-SIG, and the RL-SIG is the same as the L-SIG.

3. The method according to claim 2, wherein a modulation scheme of the L-SIG, the RL-SIG, and the signature field in the PPDU is binary phase shift keying (BPSK) modulation.

4. The method according to claim 2, wherein a remainder obtained after a value of a length field in the L-SIG modulo 3 is 0.

5. The method according to claim 1, wherein in the signature field a value of each bit in a second preset bit is 0 or 1.

6. The method according to claim 5, wherein the second preset bit comprises one or more of b2, b3, b4, and b10, wherein b2=0, b3=0, b4=1, and b10=1.

7. A data receiving method, comprising:
receiving, by a receiver, a physical layer protocol data unit (PPDU), wherein the PPDU comprises a signature field; and
when the receiver detects that the signature field meets a preset condition, determining, by the receiver, that the PPDU is a first PPDU, wherein the preset condition comprises: a standard version corresponding to the PPDU indicated by a first preset bit in the signature field,
wherein at least one of a quantity of bits and locations of the bits occupied by the CRC in the signature field are different from at least one of a quantity of bits and locations of the bits occupied by a parity bit in a repeated legacy signaling field (RL-SIG) in a high efficiency physical layer protocol data unit (HE PPDU).

8. The method according to claim 7, wherein before the determining, by the receiver, that the PPDU is a first PPDU, the method further comprises:
decoding, by the receiver, the signature field based on a tail bit in the signature field, wherein a check on a part of or all bits in the signature field by using a cyclic redundancy code (CRC) in a third preset bit in the signature field passes.

9. The method according to claim 7, wherein the preset condition further comprises: a value of each bit in a second preset bit in the signature field is a preset value.

10. The method according to claim 9, wherein the second preset bit comprises one or more of b2, b3, b4, and b10, wherein b2=0, b3=0, b4=1, and b10=1.

11. The method according to claim 7, wherein the preset condition further comprises: the PPDU comprises a legacy signaling field (L-SIG) and the RL-SIG, wherein the RL-SIG is the same as the L-SIG.

12. The method according to claim 7, wherein the preset condition further comprises: a modulation scheme of the L-SIG, the RL-SIG, and the signature field in the PPDU is binary phase shift keying (BPSK) modulation.

13. The method according to claim 11, wherein the preset condition further comprises: a remainder obtained after a value of a length field in the L-SIG modulo 3 is 0.

14. A data sending apparatus, comprising a transceiver and a processor, wherein
the processor is configured to generate a physical layer protocol data unit PPDU, wherein the PPDU comprises a signature field, and the signature field comprises one or more of: (1) a first preset bit that indicates a standard version corresponding to the PPDU; (2) a cyclic redundancy code CRC in a third preset bit that is used to check a part of or all bits in the signature field; and (3) a tail bit that is used to end binary convolutional code BCC encoding; and
the transceiver is configured to send the PPDU to a receiver,
wherein at least one of a quantity of bits and locations of the bits occupied by the CRC in the signature field are different from at least one of a quantity of bits and locations of the bits occupied by a parity bit in a repeated legacy signaling field (RL-SIG) in a high efficiency physical layer protocol data unit (HE PPDU).

15. The data sending apparatus according to claim 14, wherein the PPDU further comprises a legacy signaling field (L-SIG) and the RL-SIG, and the RL-SIG is the same as the L-SIG.

16. The data sending apparatus according to claim 15, wherein a modulation scheme of the L-SIG, the RL-SIG, and the signature field in the PPDU is binary phase shift keying (BPSK) modulation.

17. The data sending apparatus according to claim 15, wherein a remainder obtained after a value of a length field in the L-SIG modulo 3 is 0.

18. The data sending apparatus according to claim 14, wherein in the signature field a value of each bit in a second preset bit is 0 or 1.

19. The data sending apparatus according to claim 18, wherein the second preset bit comprises one or more of b2, b3, b4, and b10, wherein b2=0, b3=0, b4=1, and b10=1.

* * * * *